(12) United States Patent
Humblet et al.

(10) Patent No.: US 8,295,256 B2
(45) Date of Patent: Oct. 23, 2012

(54) PRIVATE ACCESS POINT BEACON SIGNALS IN WIRELESS NETWORKS

(75) Inventors: Pierre A. Humblet, Cambridge, MA (US); Amit Jain, Cambridge, MA (US); Woojune Kim, Arlington, MA (US); Balaji Raghothaman, Hollis, NH (US)

(73) Assignee: Airvana, Corp., Chelmsford, MA (US)

( * ) Notice: Subject to any disclaimer, the term of this patent is extended or adjusted under 35 U.S.C. 154(b) by 1090 days.

(21) Appl. No.: 12/201,380

(22) Filed: Aug. 29, 2008

(65) Prior Publication Data

US 2010/0054219 A1    Mar. 4, 2010

(51) Int. Cl.
*H04W 4/00* (2009.01)

(52) U.S. Cl. .......................... 370/338; 370/331

(58) Field of Classification Search .............. 370/338, 370/331, 332
See application file for complete search history.

(56) References Cited

U.S. PATENT DOCUMENTS

| | | | |
|---|---|---|---|
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,558,356 B2 | 7/2009 | Pollman et al. | |
| 7,558,588 B2 | 7/2009 | To et al. | |
| 2002/0196749 A1 | 12/2002 | Eyuboglu et al. | |
| 2003/0100311 A1 | 5/2003 | Chung et al. | |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif et al. | |
| 2006/0159045 A1 | 7/2006 | Ananthaiyer et al. | |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |

(Continued)

FOREIGN PATENT DOCUMENTS

GB    2452688    3/2009

(Continued)

OTHER PUBLICATIONS

3rd Generation Partnership Project 2 "3GPP2", "cdma2000 High Rate Packet Data Interface Specification", C.S0024, version 2, Oct. 27, 2000 (441 pages).

(Continued)

*Primary Examiner* — Gary Mui
(74) *Attorney, Agent, or Firm* — Fish & Richardson P.C.

(57) ABSTRACT

This patent application relates to private access point beacon signals in wireless networks.

57 Claims, 13 Drawing Sheets

U.S. PATENT DOCUMENTS

| | | | |
|---|---|---|---|
| 2007/0140218 A1 | 6/2007 | Nair et al. | |
| 2007/0155329 A1 | 7/2007 | Mehrabanzad et al. | |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |
| 2007/0238476 A1 | 10/2007 | Raman et al. | |
| 2007/0242648 A1 | 10/2007 | Garg et al. | |
| 2007/0248042 A1 | 10/2007 | Harikumar et al. | |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0162924 A1 | 7/2008 | Chinitz et al. | |
| 2008/0162926 A1 | 7/2008 | Xiong et al. | |
| 2008/0253550 A1 | 10/2008 | Ch'ng et al. | |
| 2008/0254792 A1 | 10/2008 | Ch'ng | |
| 2009/0034440 A1 | 2/2009 | Samar et al. | |
| 2009/0052395 A1 | 2/2009 | Bao et al. | |
| 2009/0082020 A1 | 3/2009 | Ch'ng et al. | |
| 2009/0088155 A1 | 4/2009 | Kim | |
| 2009/0092107 A1* | 4/2009 | Cai et al. | 370/338 |
| 2009/0116445 A1 | 5/2009 | Samar et al. | |
| 2009/0154447 A1 | 6/2009 | Humblet | |
| 2009/0156165 A1 | 6/2009 | Raghothaman et al. | |
| 2009/0156195 A1 | 6/2009 | Humblet | |
| 2009/0156218 A1 | 6/2009 | Garg et al. | |
| 2009/0163202 A1 | 6/2009 | Humblet et al. | |
| 2009/0163216 A1 | 6/2009 | Hoang et al. | |
| 2009/0163238 A1 | 6/2009 | Rao et al. | |
| 2009/0164547 A1 | 6/2009 | Ch'ng et al. | |
| 2009/0168766 A1 | 7/2009 | Eyuboglu et al. | |
| 2009/0168788 A1 | 7/2009 | Den et al. | |
| 2009/0170440 A1 | 7/2009 | Eyuboglu et al. | |
| 2009/0170475 A1 | 7/2009 | Ch'Ng et al. | |
| 2009/0170520 A1 | 7/2009 | Jones | |
| 2009/0170547 A1 | 7/2009 | Raghothaman et al. | |
| 2009/0172169 A1 | 7/2009 | Ch'Ng et al. | |
| 2009/0172397 A1 | 7/2009 | Kim | |
| 2009/0186626 A1 | 7/2009 | Raghothaman et al. | |
| 2010/0027510 A1* | 2/2010 | Balasubramanian et al. | 370/332 |
| 2010/0054219 A1 | 3/2010 | Humblet et al. | |

FOREIGN PATENT DOCUMENTS

| | | |
|---|---|---|
| WO | WO 2010/025348 | 3/2010 |

OTHER PUBLICATIONS

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

International search report and written opinion from correspondence PCT application No. PCT/US2009/055336, mailed Jan. 29, 2010 (50 pages).

Gopal, Harikumar, "Femtocells: Implementation Challenges & Solutions", XP007911199, retrieved from the internet: URL: http://www.airvana.com/file/Globecomm_2008_-_Airvana.pdf , retrieved on Jan. 19, 2010 (31 pages).

International Preliminary Report on Patentability from corresponding PCT application No. PCT/US2009/055336 mailed Mar. 10, 2011 (9 pages).

* cited by examiner

| AT ID | 1x REG | DO REG |
|---|---|---|
|  |  |  |
|  |  |  |
| ⋮ | ⋮ | ⋮ |
|  |  |  |

| AT ID | 1x REG | DO REG |
|-------|--------|--------|
| A | x—502 | |
| B | | x—504 |
| C | x—506 | x—508 |
| D | x—510 | x—512 |
| E | x—514 | |

516 { row A
518 { row B
520 { row C
522 { row D
524 { row E

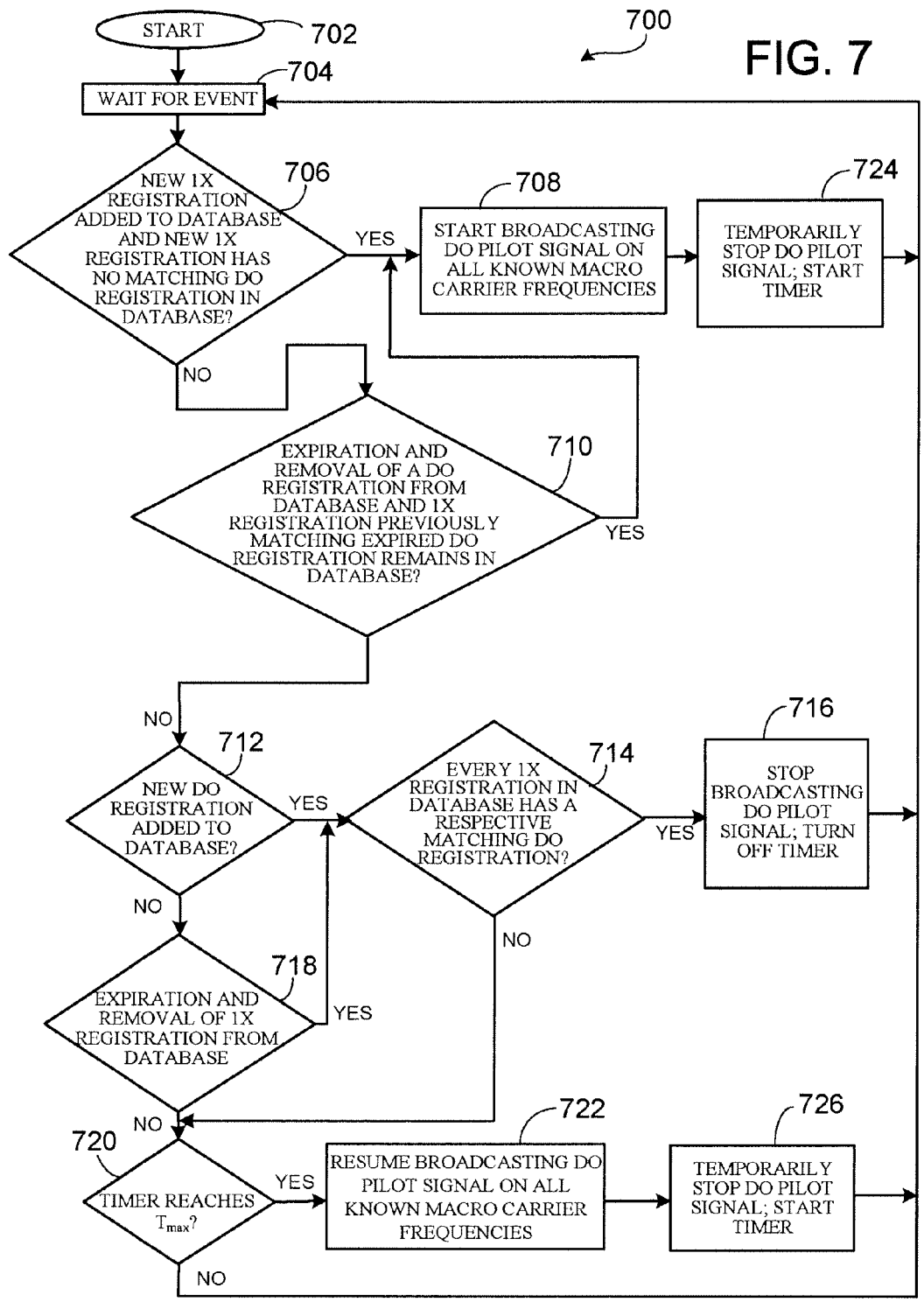

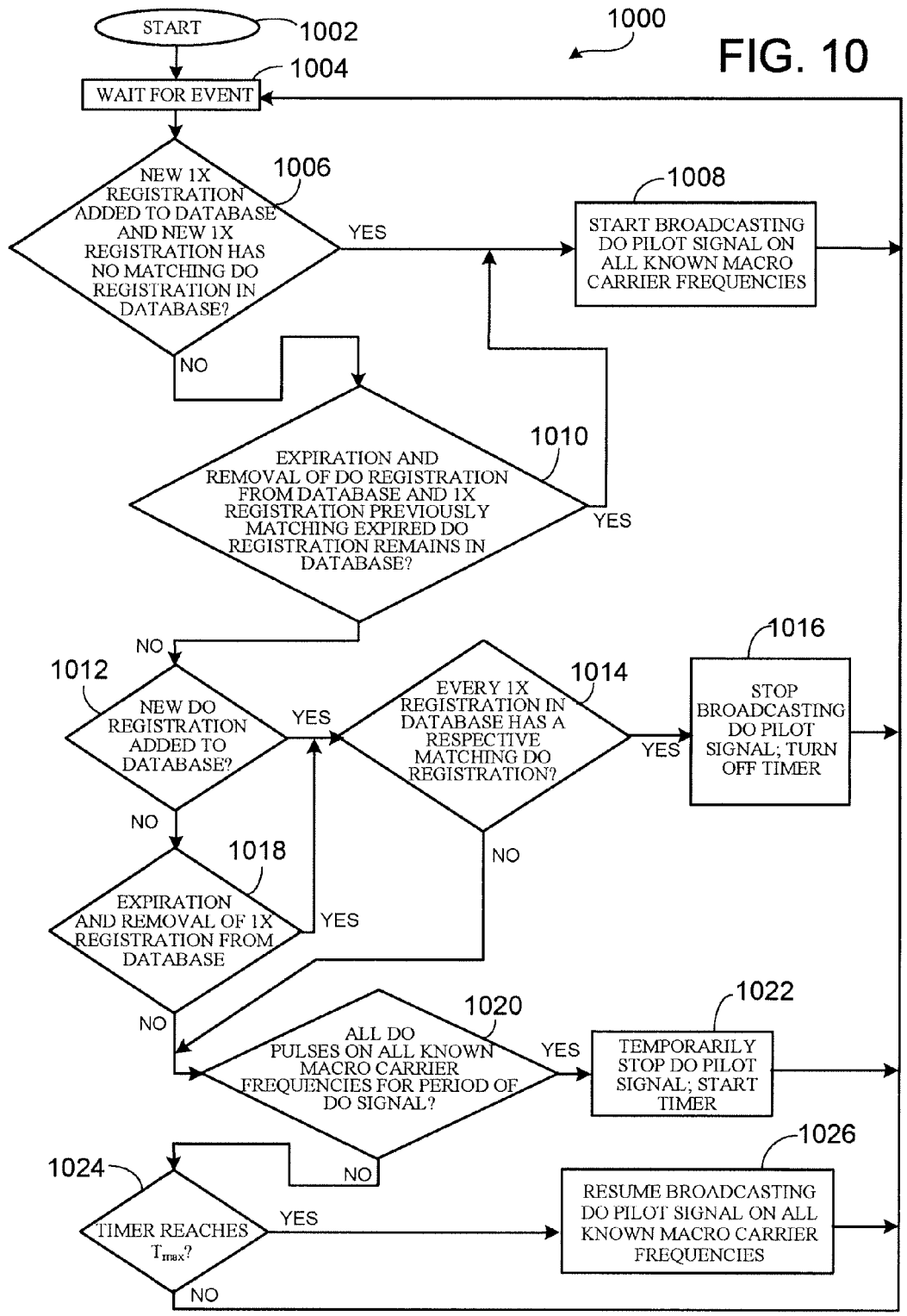

PRIVATE ACCESS POINT BEACON SIGNALS IN WIRELESS NETWORKS

BACKGROUND

This disclosure relates to private access point beacon signals in wireless networks.

When connecting to a radio network, an access terminal selects an access point from available radio network access points that are found to be within communication range. Network protocols are used in communicating between an access point and an access terminal.

The 1xRTT protocol has been standardized by the Telecommunication Industry Association (TIA) in the TIA-2000.1 through TIA-2000.6 series of specifications, which are incorporated herein by reference.

The 1xEV-DO protocol has been standardized by the TIA as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-8560B, 3GPP2 C.S0024-B, version 1.0, May 2006, and is also incorporated herein by reference. Other wireless communication protocols, such as UMTS (Universal Mobile Telecommunications Service), may also be used.

SUMMARY

In general, in some aspects, a method includes, storing, in a memory on a private access point, first air interface standard registrations and second air interface standard registrations. The private access point includes the memory and is configured to communicate via a first air interface standard and a second air interface standard with authorized and registered access terminals. The authorized and registered access terminals are authorized and registered on the private access point for communications according to at least one air interface standard of a set of air interface standards. The method includes, when the first number of the first air interface standard registrations is less than a number of the authorized and registered access terminals, starting periodically transmitting a beacon signal on one or more carrier frequencies used by a macro access point. The beacon signal corresponds to the first air interface standard. The method also includes, when the first number of the first air interface standard registrations is equal to the number of the authorized and registered access terminals, stopping periodically transmitting the beacon signal.

Implementations may include one or more of the following features.

In the method, the first air interface standard may include EV-DO, and the second air interface standard may include 1xRTT.

The method may also include allowing a first air interface standard registration of the first number of the first air interface standard registrations to expire from the memory after an expiration time period elapses, so that the first number of the first air interface standard registrations more accurately reflects another number of authorized and registered access terminals actually able to communicate with the private access point for first air interface standard communications.

In the method, at least one of the first number of the first air interface standard registrations, a second number of the second air interface standard registrations, or the number of the authorized and registered access terminals may change as authorized access terminals of the number of the authorized and registered access terminals register on the private access point and as first air interface standard registrations and second air interface standard registrations for the authorized access terminals expire from the memory.

In the method, when the first number of the first air interface standard registrations is equal to a second number of the second air interface standard registrations, the first number of the first air interface standard registrations is equal to the number of the authorized and registered access terminals, and the number of the authorized and registered access terminals is nonzero, then each authorized access terminal of the number of the authorized and registered access terminals will have a corresponding first air interface standard registration of the first number of the first air interface standard registrations and a corresponding second air interface standard registration of the second number of the second air interface standard registrations.

In the method, starting periodically transmitting the beacon signal may include, in a first period of the beacon signal, increasing a signal strength of the beacon signal in steps from a first signal strength value up to a second signal strength value. Increasing the signal strength of the beacon signal in steps may include doubling the signal strength with each step. The signal strength may be doubled N times, and the second signal strength value may be $2^N$ times the first signal strength value. Starting periodically transmitting the beacon signal may further include, in a second period of the beacon signal, transmitting the beacon signal at the second signal strength value. Starting periodically transmitting the beacon signal may further include, in a second period of the beacon signal, transmitting the beacon signal at the first signal strength value; and increasing the signal strength of the beacon signal in steps from the first signal strength value up to the second signal strength value. Starting periodically transmitting the beacon signal may further include, in a second period of the beacon signal, transmitting the beacon signal at a third signal strength value. The third signal strength value may be greater than the first signal strength value and less than the second signal strength value. Starting periodically transmitting the beacon signal may further include, in a second period of the beacon signal, increasing the signal strength of the beacon signal in steps from the third signal strength value up to the second signal strength value.

In the method, starting periodically transmitting the beacon signal may include, in a first period of the beacon signal, starting transmitting the beacon signal at a first signal strength value on a first carrier frequency of the one or more macro carrier frequencies; transmitting the beacon signal at the first signal strength value on an Mth carrier frequency of the one or more macro carrier frequencies; increasing a signal strength of the beacon signal from the first signal strength value to a second signal strength value; transmitting the beacon signal at the second signal strength value on the first carrier frequency; transmitting the beacon signal at the second signal strength value on the Mth carrier frequency; and temporarily stopping transmitting the beacon signal until a second period of the beacon signal.

In the method, the first number of the first air interface standard registrations may be equal to the number of the authorized and registered access terminals at least because the number of the authorized and registered access terminals decreased following an expiration of a second air interface standard registration from the memory.

In the method, the first number of the first air interface standard registrations may be equal to the number of the authorized and registered access terminals at least because the first number of the first air interface standard registrations increased following a first air interface standard registration being received by the memory when an authorized access terminal registered on the private access point in response to the beacon signal.

In the method, the first number of the first air interface standard registrations may not be equal to the number of the authorized and registered access terminals at least because the first number of the first air interface standard registrations decreased following an expiration of a first air interface standard registration from the memory.

In the method, starting periodically transmitting the beacon signal may begin only each time that the first number of the first air interface standard registrations becomes less than the number of the authorized and registered access terminals.

In the method, the set of air interface standards may include the first air interface standard and the second air interface standard. A first authorized and registered access terminal of the authorized and registered access terminal may be authorized and registered on the private access point for first air interface standard communications only, a second authorized and registered access terminal of the authorized and registered access terminals may be authorized and registered on the private access point for second air interface standard communications only, and a third authorized and registered access terminal of the authorized and registered access terminals may be authorized and registered on the private access point for both first air interface standard and second air interface standard communications.

In the method, storing may include storing, in the memory, third air interface standard registrations. The private access point may be further configured to communicate via a third air interface standard with the authorized and registered access terminals. The set of air interface standards may include the first air interface standard, the second air interface standard, and the third air interface standard. A first authorized and registered access terminal of the authorized and registered access terminal may be authorized and registered on the private access point for first air interface standard communications only, a second authorized and registered access terminal of the authorized and registered access terminals may be authorized and registered on the private access point for second air interface standard and third air interface standard communications only, a third authorized and registered access terminal of the authorized and registered access terminals may be authorized and registered on the private access point for third air interface standard communications only.

In the method, the set of air interface standards may include the first air interface standard, the second air interface standard, and one or more additional air interface standards. The one or more additional air interface standards may include a third air interface standard and a fourth air interface standard, a first authorized and registered access terminal of the authorized and registered access terminal may be authorized and registered on the private access point for third air interface standard communications only, a second authorized and registered access terminal of the authorized and registered access terminals may be authorized and registered on the private access point for second air interface standard and fourth air interface standard communications only, and a third authorized and registered access terminal of the authorized and registered access terminals may be authorized and registered on the private access point for first air interface standard, third air interface standard, and fourth air interface standard communications only.

In some aspects, one or more machine-readable media store executable instructions. The instructions are for causing one or more processing devices to store, in a memory on a private access point, first air interface standard registrations and second air interface standard registrations. The private access point includes the memory and is configured to communicate via a first air interface standard and a second air interface standard with authorized and registered access terminals. The authorized and registered access terminals are registered on the private access point for communications according to at least one air interface standard of a set of air interface standards. The instructions are also for causing one or more processing devices to, when the first number of the first air interface standard registrations is less than a number of the authorized and registered access terminals, start periodically transmitting a beacon signal on one or more carrier frequencies used by a macro access point. The beacon signal corresponds to the first air interface standard. The instructions are also for causing one or more processing devices to, when the first number of the first air interface standard registrations is equal to the number of the authorized and registered access terminals, stop periodically transmitting the beacon signal.

Implementations may include one or more of the following features.

In the one or more machine-readable media, the first air interface standard may include EV-DO, and the second air interface standard may include 1xRTT.

In the one or more machine-readable media, when the first number of the first air interface standard registrations is equal to a second number of the second air interface standard registrations, the first number of the first air interface standard registrations is equal to the number of the authorized and registered access terminals, and the number of the authorized and registered access terminals is nonzero, then each authorized access terminal of the number of the authorized and registered access terminals will have a corresponding first air interface standard registration of the first number of the first air interface standard registrations and a corresponding second air interface standard registration of the second number of the second air interface standard registrations.

In the one or more machine-readable media, starting periodically transmitting the beacon signal may include, in a first period of the beacon signal, increasing a signal strength of the beacon signal in steps from a first signal strength value up to a second signal strength value. Increasing the signal strength of the beacon signal in steps may include doubling the signal strength with each step.

In the one or more machine-readable media, starting periodically transmitting the beacon signal may include, in a first period of the beacon signal, starting transmitting the beacon signal at a first signal strength value on a first carrier frequency of the one or more macro carrier frequencies; transmitting the beacon signal at the first signal strength value on an Mth carrier frequency of the one or more macro carrier frequencies; increasing a signal strength of the beacon signal from the first signal strength value to a second signal strength value; transmitting the beacon signal at the second signal strength value on the first carrier frequency; transmitting the beacon signal at the second signal strength value on the Mth carrier frequency; and temporarily stopping transmitting the beacon signal until a second period of the beacon signal.

In the one or more machine-readable media, the first number of the first air interface standard registrations may be equal to the number of the authorized and registered access terminals at least because the number of the authorized and registered access terminals decreased following an expiration of a second air interface standard registration from the memory.

In the one or more machine-readable media, the first number of the first air interface standard registrations may be equal to the number of the authorized and registered access terminals at least because the first number of the first air interface standard registrations increased following a first air interface standard registration being received by the memory when an authorized access terminal registered on the private access point in response to the beacon signal.

In the one or more machine-readable media, the first number of the first air interface standard registrations may not be equal to the number of the authorized and registered access terminals at least because the first number of the first air interface standard registrations decreased following an expiration of a first air interface standard registration from the memory.

In the one or more machine-readable media, starting periodically transmitting the beacon signal may begin only each time that the first number of the first air interface standard registrations becomes less than the number of the authorized and registered access terminals.

In the one or more machine-readable media, wherein the set of air interface standards may include the first air interface standard and the second air interface standard. A first authorized and registered access terminal of the authorized and registered access terminal may be authorized and registered on the private access point for first air interface standard communications only, a second authorized and registered access terminal of the authorized and registered access terminals may be authorized and registered on the private access point for second air interface standard communications only, and a third authorized and registered access terminal of the authorized and registered access terminals may be authorized and registered on the private access point for both first air interface standard and second air interface standard communications.

In the one or more machine-readable media, storing may include storing, in the memory, third air interface standard registrations. The private access point may be further configured to communicate via a third air interface standard with the authorized and registered access terminals. The set of air interface standards may include the first air interface standard, the second air interface standard, and the third air interface standard.

In some aspects, a system includes a private access point configured to communicate via a first air interface standard and a second air interface standard with authorized and registered access terminals. The authorized and registered access terminals are registered on the private access point for communications according to at least one air interface standard of a set of air interface standards. The private access point includes memory. The memory is configured to store first air interface standard registrations and second air interface standard registrations. The memory is configured to store instructions for execution. The private access point also includes one or more processing devices configured to execute the instructions. The instructions are for causing the one or more processing devices to, when the first number of the first air interface standard registrations is less than a number of the authorized and registered access terminals, start periodically transmitting a beacon signal on one or more carrier frequencies used by a macro access point. The beacon signal corresponds to the first air interface standard. The instructions are also for causing the one or more processing devices to, when the first number of the first air interface standard registrations is equal to the number of the authorized and registered access terminals, stop periodically transmitting the beacon signal.

In the system, the first air interface standard may include EV-DO, and the second air interface standard may include 1xRTT.

In the system, when the first number of the first air interface standard registrations is equal to a second number of the second air interface standard registrations, the first number of the first air interface standard registrations is equal to the number of the authorized and registered access terminals, and the number of the authorized and registered access terminals is nonzero, then each authorized access terminal of the number of the authorized and registered access terminals will have a corresponding first air interface standard registration of the first number of the first air interface standard registrations and a corresponding second air interface standard registration of the second number of the second air interface standard registrations.

In the system, starting periodically transmitting the beacon signal may include, in a first period of the beacon signal, increasing a signal strength of the beacon signal in steps from a first signal strength value up to a second signal strength value. Increasing the signal strength of the beacon signal in steps may include doubling the signal strength with each step.

In the system, starting periodically transmitting the beacon signal may include, in a first period of the beacon signal, starting transmitting the beacon signal at a first signal strength value on a first carrier frequency of the one or more macro carrier frequencies; transmitting the beacon signal at the first signal strength value on an Mth carrier frequency of the one or more macro carrier frequencies; increasing a signal strength of the beacon signal from the first signal strength value to a second signal strength value; transmitting the beacon signal at the second signal strength value on the first carrier frequency; transmitting the beacon signal at the second signal strength value on the Mth carrier frequency; and temporarily stopping transmitting the beacon signal until a second period of the beacon signal.

In the system, the first number of the first air interface standard registrations may be equal to the number of the authorized and registered access terminals at least because the number of the authorized and registered access terminals decreased following an expiration of a second air interface standard registration from the memory.

In the system, the first number of the first air interface standard registrations may be equal to the number of the authorized and registered access terminals at least because the first number of the first air interface standard registrations increased following a first air interface standard registration being received by the memory when an authorized access terminal registered on the private access point in response to the beacon signal.

In the system, the first number of the first air interface standard registrations may not be equal to the number of the authorized and registered access terminals at least because the first number of the first air interface standard registrations decreased following an expiration of a first air interface standard registration from the memory.

In the system, starting periodically transmitting the beacon signal may begin only each time that the first number of the first air interface standard registrations becomes less than the number of the authorized and registered access terminals.

In the system, the set of air interface standards may include the first air interface standard and the second air interface standard. A first authorized and registered access terminal of the authorized and registered access terminal may be authorized and registered on the private access point for first air interface standard communications only, a second authorized and registered access terminal of the authorized and registered access terminals may be authorized and registered on the private access point for second air interface standard communications only, and a third authorized and registered access terminal of the authorized and registered access terminals may be authorized and registered on the private access point for both first air interface standard and second air interface standard communications.

In the system, the memory may be further configured to store third air interface standard registrations. The private access point may be further configured to communicate via a third air interface standard with the authorized and registered access terminals. The set of air interface standards may include the first air interface standard, the second air interface standard, and the third air interface standard.

In some aspects, a method includes transmitting, from a private access point, a beacon signal on one or more carrier frequencies used by a macro access point. The private access point is configured to communicate via a first air interface standard and a second air interface standard. The first air interface standard includes EV-DO. The beacon signal corresponds to EV-DO. The method also includes starting and stopping transmitting the beacon signal based on one or more events. The method also includes increasing a signal strength of the beacon signal until one event of the one or more events occurs or a time period is reached.

In some aspects, a private access point is configured to communicate via a first air interface standard and a second air interface standard. The first air interface standard includes EV-DO. The private access point includes means for transmitting a beacon signal on one or more carrier frequencies used by a macro access point. The beacon signal corresponds to EV-DO. The private access point also includes means for starting and stopping transmitting the beacon signal based on one or more events. The private access point also includes means for increasing a signal strength of the beacon signal until one event of the one or more events occurs or a time period is reached.

In some aspects, one or more machine-readable media store executable instructions. The instructions are for causing one or more processing devices to transmit, from a private access point, a beacon signal on one or more carrier frequencies used by a macro access point. The private access point is configured to communicate via a first air interface standard and a second air interface standard. The first air interface standard includes EV-DO. The beacon signal corresponds to EV-DO. The instructions are also for causing the one or more processing devices to start and stop transmitting the beacon signal based on one or more events. The instructions are also for causing the one or more processing devices to increase a signal strength of the beacon signal until one event of the one or more events occurs or a time period is reached.

In some aspects, a system includes a private access point configured to communicate via a first air interface standard and a second air interface standard. The first air interface standard includes EV-DO. The private access point includes memory configured to store instructions for execution. The private access point also includes one or more processing devices configured to execute the instructions. The instructions are for causing the one or more processing devices to transmit a beacon signal on one or more carrier frequencies used by a macro access point. The beacon signal corresponds to EV-DO. The instructions are also for causing the one or more processing devices to start and stop transmitting the beacon signal based on one or more events. The instructions are also for causing the one or more processing devices to increase a signal strength of the beacon signal until one event of the one or more events occurs or a time period is reached.

In some aspects, a method includes periodically transmitting, from a private access point, a beacon signal on one or more carrier frequencies used by a macro access point. The private access point is configured to communicate via a first air interface standard and a second air interface standard. The beacon signal corresponds to the first air interface standard. The method also includes stopping periodically transmitting the beacon signal when each access terminal authorized by and registered on the private access point is registered on the private access point for first air interface standard communications.

Implementations may include one or more of the following features.

The method may also include determining an initial signal strength value of the beacon signal by detecting the signal strength of one or more signals from a macro access point and adding an offset.

In some aspects, a private access point is configured to communicate via a first air interface standard and a second air interface standard. The private access point includes means for periodically transmitting a beacon signal on one or more carrier frequencies used by a macro access point. The beacon signal corresponds to the first air interface standard. The private access point also includes means for stopping periodically transmitting the beacon signal when each access terminal authorized by and registered on the private access point is registered on the private access point for first air interface standard communications.

In some aspects, one or more machine-readable media store executable instructions. The instructions are for causing one or more processing devices to periodically transmit, from a private access point, a beacon signal on one or more carrier frequencies used by a macro access point. The private access point is configured to communicate via a first air interface standard and a second air interface standard. The beacon signal corresponds to the first air interface standard. The instructions are also for causing one or more processing devices to stop periodically transmitting the beacon signal when each access terminal authorized by and registered on the private access point is registered on the private access point for first air interface standard communications.

In some aspects, a system includes a private access point configured to communicate via a first air interface standard and a second air interface standard. The private access point includes memory configured to store instructions for execution. The private access point also includes one or more processing devices configured to execute the instructions. The instructions are for causing the one or more processing devices to periodically transmit a beacon signal on one or more carrier frequencies used by a macro access point. The beacon signal corresponds to the first air interface standard. The instructions are also for causing the one or more processing devices to stop periodically transmitting the beacon signal when each access terminal authorized by and registered on the private access point is registered on the private access point for first air interface standard communications.

The foregoing methods may be implemented as one or more machine-readable media storing instructions that are executable on one or more processing devices to implement the methods. The foregoing methods may be implemented as a computer program product comprised of instructions that are stored on one or more machine-readable media, and that are executable on one or more processing devices. The foregoing methods may be implemented as an apparatus or system that includes one or more processing devices and memory to store executable instructions to implement the methods.

The details of one or more examples are set forth in the accompanying drawings and the description below. Further features, aspects, and advantages are apparent in the description, the drawings, and the claims.

DESCRIPTION OF THE DRAWINGS

FIG. 5 is a diagram illustrating example content of the table.

FIG. 7 is a flow diagram showing an example process of a private access point.

FIG. 10 is a flow diagram showing an example process of a private access point.

DETAILED DESCRIPTION

Figure 1:
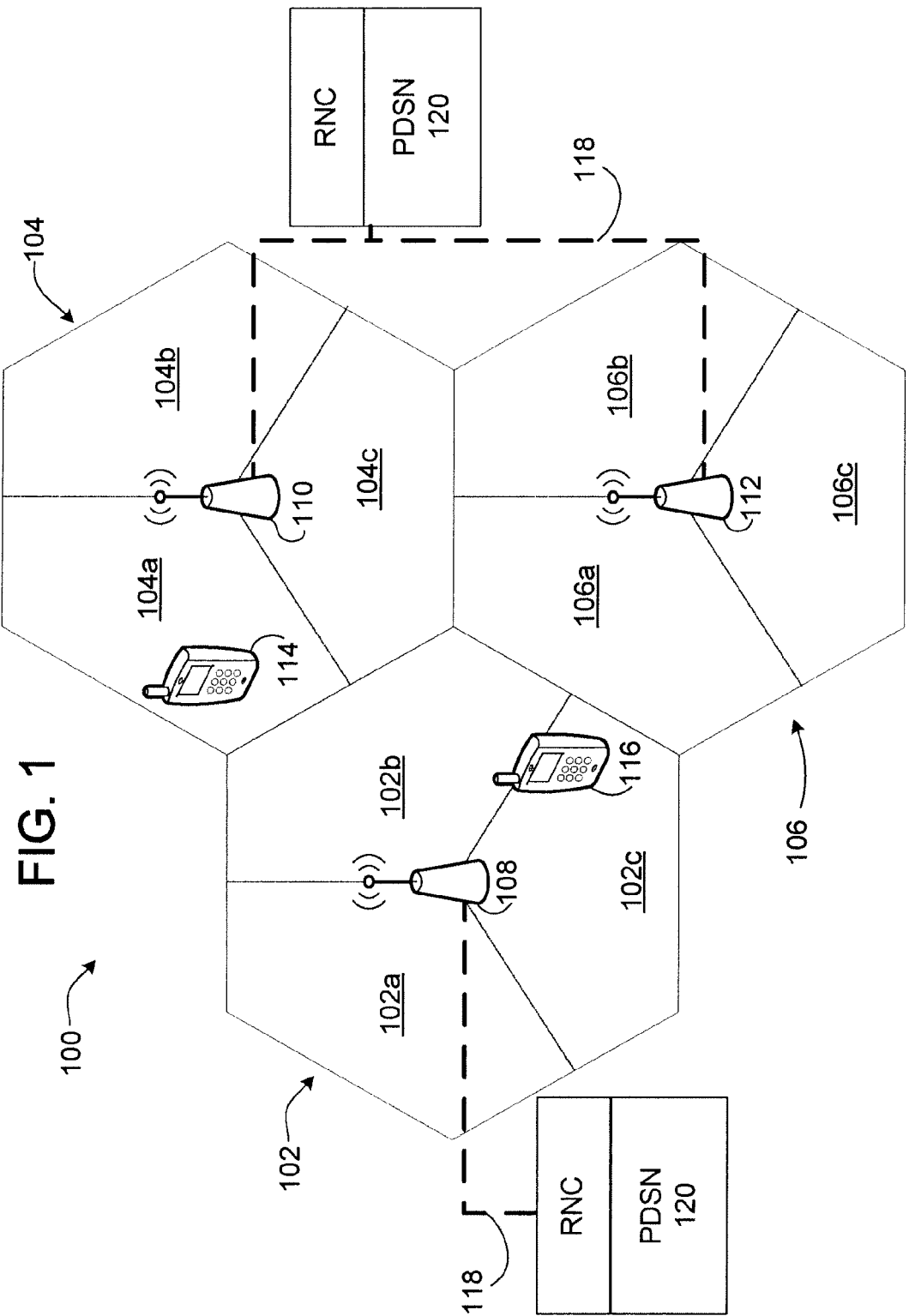
FIG. 1 is a diagram illustrating a wireless network.

Cellular wireless communications systems are designed to serve many access terminals distributed in a large geographic area by dividing the area into cells, as shown in FIG. 1. At or near the center of each cell 102, 104, 106, a radio network access point 108, 110, 112, also referred to as a base transceiver station (BTS), is located to serve access terminals 114, 116 (e.g., cellular telephones, laptops, PDAs, also known as mobile stations) located in the cell. Each cell is often further divided into sectors 102*a-c*, 104*a-c*, 106*a-c* by using multiple sectorized antennas. In each cell, that cell's radio network access point may serve one or more sectors and may communicate with multiple access terminals in its cell.

The radio access network (RAN) 100 shown in FIG. 1 uses a 1xRTT protocol or an EV-DO protocol to transmit voice and data packets between an access terminal, e.g., access terminals 114, 116, and a radio network access point, e.g., access points 108, 110, 112. In the example of FIG. 1, the access points 108, 110, 112 are connected over a backhaul connection 118 to radio network control/packet data serving nodes (RNC/PDSN) 120, which may be one or more physical devices at different locations. Although this description uses terminology from the 1xRTT ("1x") and EV-DO ("DO") air interface standards in CDMA (Code Division Multiple Access) networks, the same concepts are applicable to other communication methods, including UMTS (Universal Mobile Telecommunications Service), GSM (Global System for Mobile Communications), HSDPA (High Speed Downlink Packet Access), WiMax (Worldwide Interoperability for Microwave Access), WiBro (Wireless Broadband), WiFi, and the like.

Figure 2:
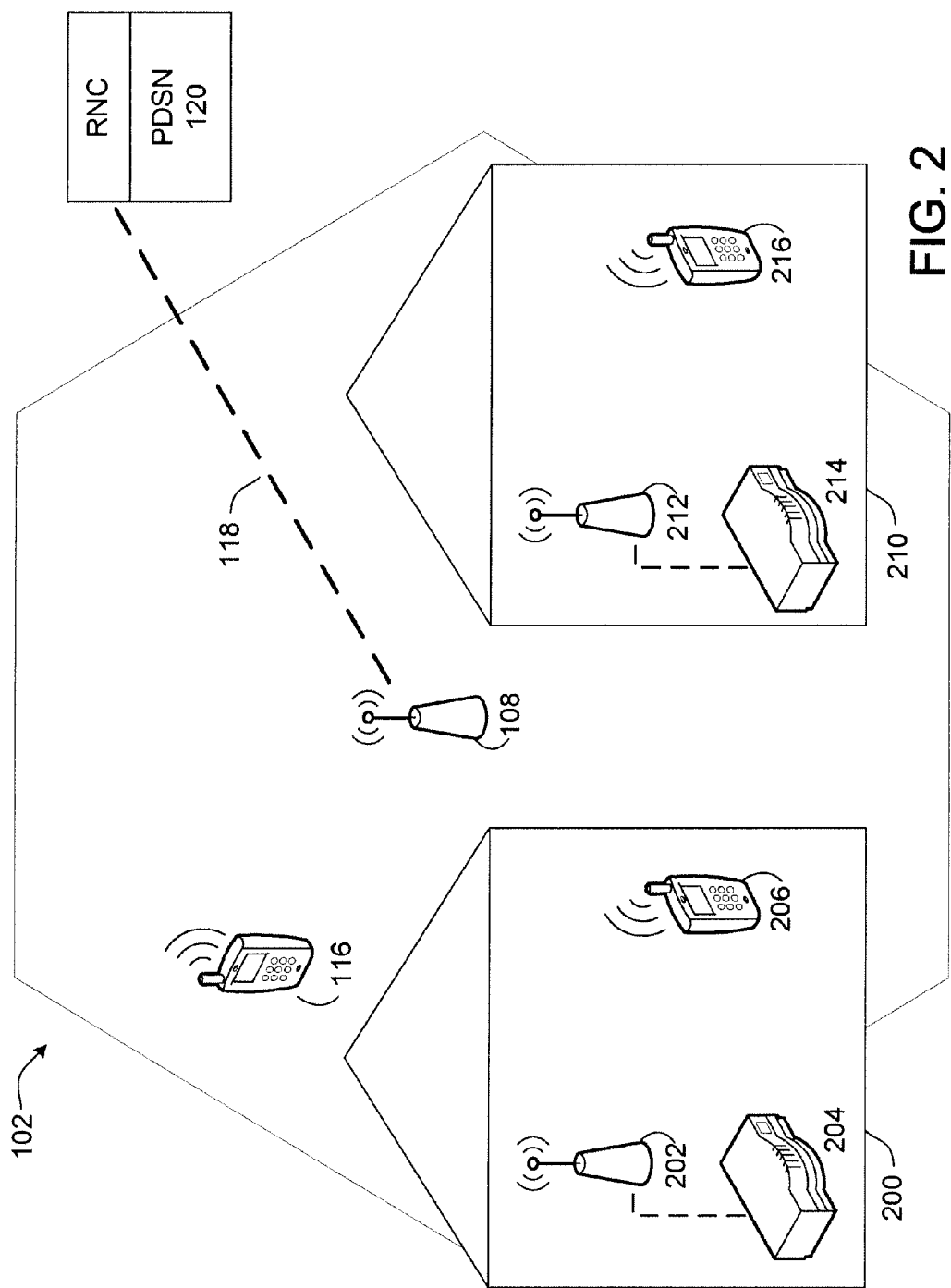
FIG. 2 is a diagram illustrating a wireless network with a home networking deployment.

In some examples, as shown in FIG. 2, a radio network access point 202 may be deployed in a user's home 200 in a similar manner as a WiFi® access point. Such a radio network access point is referred to as a private access point. The private access point 202 may use an available high-speed internet connection, such as a DSL or cable modem 204, as the backhaul with the RNC/PDSN functionality implemented in the private access point 202. Such a private access point may be installed anywhere, for example, in an office, a public space, or a restaurant. When this description refers to a private access point being in a "home," that encompasses any such location. Private access points may include, for example, femtocells or picocells. In some examples, a private access point may be integrated into a cable modem or other network hardware, such as a router or WiFi access point.

When an authorized access terminal 206 is present inside the home (or anywhere within range of the private access point 202), it may use the private access point 202 rather than a regular cellular radio network access point, such as the access point 108, to place or receive voice calls and data connections, even if the access terminal is otherwise within the cell 102 for that access point 108. We sometimes refer to the standard access point 108 as a macro access point or macro BTS to distinguish the standard access point 108 from a private access point, as the standard access point 108 provides direct access to the wider RAN.

As in FIG. 1, the macro access point 108 of FIG. 2 is connected over the backhaul connection 118 to the radio network control/packet data serving nodes (RNC/PDSN) 120, which may be one or more physical devices at different locations. The RNC/PDSN 120 may be referred to as one or more macro controllers, or one or more macro radio network controllers (macro RNC). The macro RNC 120 may include functionality to manage macro access points, such as the macro access point 108, and facilitate communication between the macro access point 108 and access terminals, such as the access terminal 206. In general, any function attributed to the RNC/PDSN 120 may be implemented in the RNC/PDSN 120, in one or more macro access points such as the macro access point 108, or in any combination thereof. It should be understood that an access terminal may send signals to and receive signals from the macro access point 108.

A neighboring home 210 may have its own private access point 212 connected to its cable modem 214 for use by its owner's access terminal 216. Neighboring private access points may operate independently, in part because real-time communications is difficult between neighboring private access points. Private access points may also operate in a licensed spectrum.

Access lists of authorized access terminals for each private access point can be configured and distributed to private access points, such as private access points 202, 212. Access location lists such as preferred roaming lists (PRLs) that may contain information to locate, identify, and access sets of private access points and other access points may be configured and distributed to access terminals. The authorization lists and PRLs may be updated periodically.

Access terminals such as the access terminals 206, 216 of FIG. 2 may store an access location list such as a PRL. A PRL may list identifiers or addresses of access points with which an access terminal may communicate. An access terminal may select an access point using the list for communication according to the 1xRTT air interface standard, the EV-DO air interface standard, or both.

Access terminals, such as the access terminal 206 shown in FIG. 2, that communicate via the 1xRTT and EV-DO air interface standards generally include a radio transmitter and receiver for parallel communication via these standards: the access terminal 206 may alternate between transmitting voice packets according to the 1xRTT protocol and transmitting data packets according to the EV-DO protocol, for example.

An access terminal such as the access terminal 206 may be described as including three operational states for each air interface: an "idle" state, an "idle to active" state, and an "active" state. The idle state may include a period during which the access terminal is turned on and "idling" on a carrier frequency, but is dormant and not actively communicating with an access point (or communicating with the RAN 100 via an access point). The idle to active state may include a period during which the access terminal transitions from a dormant, idling state to an active communicating state, such as when the access terminal is trying to make or receive a phone call. The active state may include a period during which the access terminal is actively communicating with an access point (or communicating with the RAN 100 via an access point).

When discussing interactions of an access terminal with an access point, for ease of description, reference may be made to communications between the access terminal and the access point, but this may also include or refer to, e.g., an idle state of an access terminal, in which the access terminal may be in a dormant state and listening to, but not actively communicating with, the access point.

For ease of description, communication between wireless network entities, such as between access points and access terminals, is described as occurring at the access point transmission frequency. In general, however, for example, frequency division duplex (FDD) may be used where the transmit frequency of an entity may be associated with, but distinct from, the receive frequency of the entity.

Access points may have network addresses associated with them to facilitate communication with access terminals. The addresses may include System ID/Network ID (SID/NID) address pairs that are compatible with, and configured for, communication via the 1xRTT air interface standard ("1x standard") and Sector ID addresses that are compatible with, and configured for, communication via the EV-DO air interface standard ("DO standard").

In an implementation, the access terminal 206 includes two basic procedures for communication via the 1x and DO standards, startup and "rove-in". Startup refers to a process by which the access terminal 206 may boot up and search for an access point to communicate with, ultimately acquiring, for example, respective 1x and DO voice and data connections with the private access point 202. Rove-in refers to a process by which the access terminal 206 may acquire respective 1x and DO voice and data connections between its 1x and DO radio transmitter/receiver and the private access point 202 by switching communication from, for example, the macro access point 108 or another private access point such as private access point 212, while in the idle state.

For the startup process, an access terminal 206 that boots up at the user's home 200 will first consult a PRL stored on the access terminal 206. The access terminal 206 will attempt to acquire a channel by listening to the sets of carrier frequencies for 1x communications identified in the PRL. When the access terminal 206 hears a broadcast message with a SID/NID identifier from an access point on one of the selected frequencies for 1x communications, the terminal 206 consults its PRL to see if there are any SID/NID identifiers that are higher in priority than the received SID/NID. If higher priority SID/NID identifiers are in the PRL, the access terminal 206 eventually attempts to acquire a channel by listening to a set of carrier frequencies, one by one, in order, for 1x communication corresponding to the higher priority SID/NID identifier in the PRL. If no higher priority SID/NID identifiers are in the PRL, the access terminal 206 initiates communication with the access point entity that sent the broadcast message.

The "rove-in" process may differ somewhat from the startup process, and may include several scenarios. In a first scenario, the access terminal 206 of FIG. 2 may detect a stronger 1x signal coming from the private access point 202 than from either the macro access point 108 or the private access point 212.

In a second scenario, the access terminal 206 may also begin the "rove-in" process by detecting a 1x beacon signal from the private access point 202 on the same frequency that the access terminal is communicating with the macro access point 108 or the private access point 212. The private access point 202 may transmit the beacon signal in order to instruct the access terminal 206 to look for a 1x standard signal on the frequency at which the private access point 202 supports 1x standard transmissions. Once the access terminal 206 is directed to the other frequency and can detect the stronger 1x signal, the rove-in process proceeds as in the first scenario.

A beacon signal may include a pilot signal and a data signal. An access terminal may compare the signal strength of a pilot signal in a beacon signal to the signal strength of a pilot signal from, e.g., a macro access point, or another private access point. A data signal may be used to carry instructions, such as redirection messages. Redirection messages, which may be addressed in a broadcast, multicast, or unicast manner to access terminals, may be used to instruct an access terminal to go to another carrier frequency to listen for signals corresponding to the air interface standard of the beacon signal.

Regardless of the way in which the "rove-in" process may begin, the access terminal 206 eventually detects a 1x signal with a particular SID/NID coming from the private access point 202. In the case of the private access point 202, the access terminal 206 may eventually send a registration message to the private access point 202 and begin communication via the 1x standard.

For communication via the EV-DO protocol, the startup process and rove-in process, absent other constraints, may each proceed in a manner parallel to that seen for communication via the 1x protocol. For example, a private access point 202, absent other constraints, may be configured to provide a beacon signal for the DO standard (to instruct the access terminal 206 to look for a DO standard signal on the frequency at which the private access point 202 supports DO standard transmissions).

Access terminals may be authorized or not authorized to communicate with a particular private access point. The access terminal 206 of FIG. 2 is authorized to communicate with the private access point 202, but may not be authorized to communicate with the private access point 212. The access terminal 216 of FIG. 2 is authorized to communicate with the private access point 212, but may not be authorized to communicate with the private access point 202. The access terminals 206, 212 are permitted to communicate with macro access points such as the macro access point 108. The access terminal 116 of FIG. 2 may not be authorized to communicate with the private access points 202, 212 and may instead communicate with macro access points, such as the macro access point 108. The unauthorized access terminal 116 may be referred to as a macro access terminal (MAT) 116.

Figures 3, 4:
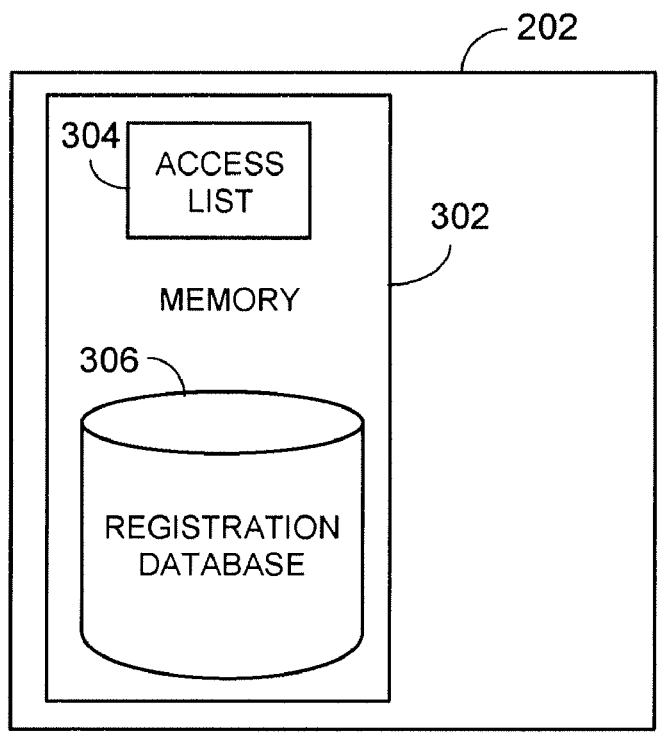
FIG. 3 is a block diagram illustrating an example implementation of a private access point.
FIG. 4 is a diagram illustrating a registration database expressed as a table.

FIG. 3 is a block diagram illustrating an example implementation of the private access point 202. The private access point 202 includes memory 302. Memory 302 stores an access list 304, a registration database 306, and processing routines (not shown). The private access point 202 may also include one or more processing devices (not shown), an input/output interface (not shown), and one or more transmitters and receivers (not shown). The access list 304 may be updated periodically and may list authorized access terminals for the private access point 202. Since the access terminal 206 is authorized to register and communicate with the private access point 202, the access list 304 generally includes an identifier that identifies and corresponds to the access terminal 206. The registration database 306 may store registration information corresponding to the 1x and DO air interface standards. The database 306 may store 1x and DO registrations. The registration database 306 may store registration information and/or registrations for more than two air interface standards.

When the access terminal 206 hears a 1x signal from the private access point 202, the access terminal 206 may send a 1x registration message to the private access point 202. Upon receipt of the 1x registration message, the private access point 202 may check the access list 304 to determine whether the access terminal 206 is authorized to register and communicate with the private access point 202. Upon confirming that the access terminal 206 is authorized, the private access point 202 may update the registration database 306 with a new 1x registration that corresponds to the access terminal 206.

Similarly, when the access terminal 206 hears a DO signal from the private access point 202, the access terminal 206 may send a DO registration message to the private access point 202. Upon receipt of the DO registration message, the private access point 202 may check the access list 304 to determine whether the access terminal 206 is authorized to register and communicate with the private access point 202. Upon confirming that the access terminal 206 is authorized, the private access point 202 may update the registration database 306 with a new DO registration that corresponds to the access terminal 206.

By contrast, when the unauthorized MAT 116 hears either a 1x signal or a DO signal from the private access point 202, the MAT 116 may send a 1x (or DO) registration message to the private access point 202. Upon receipt of the registration message, the private access point 202 may check the access list 304. Upon determining that the unauthorized MAT 116 is not on the access list 304, the private access point 202 may generally reject the registration message by sending a message to the MAT 116.

FIG. 4 is a diagram illustrating the registration database 306 expressed as a conceptual table 400. A first column 402 of the table 400 includes identifiers for authorized and registered access terminals, with rows of the table 400 (e.g., rows 410, 412) each configured to store a different access terminal identifier in the column 402. A second column 404 includes any 1x registrations corresponding to the authorized and registered access terminals identified in the column 402, while a third column 406 includes any DO registrations corresponding to the authorized and registered access terminals identified in the column 402. A header row 408 identifies the first column 402 as "AT ID" (access terminal identifier), the second column 404 as "1x REG" (1x registration), and the third column 406 as "DO REG" (DO registration).

An identifier for an authorized and registered access terminal in the table 400 may be a unique hardware identifier for an access terminal. An identifier may be a resulting value after a hashing or other algorithm is applied to a unique hardware identifier for an access terminal.

In communications with an authorized and registered access terminal, the access terminal may appear to have more than one hardware identifier. For example, an access terminal may have an Electronic Serial Number (ESN), or a Mobile Equipment Identifier (MEID). The access terminal may have another type of hardware identifier. If an access terminal uses an ESN, then the access terminal (and/or a private access point communicating with the access terminal) may generally use an ESN for both DO and 1x communications. For example, if an access terminal uses an MEID for DO communications, the access terminal (and/or a private access point communicating with the access terminal) may generally use a pseudo ESN (PESN) for 1x communications. The pESN is a resulting value after a hashing algorithm is applied to the MEID. In an implementation, the registration database 306 may store more than one identifier for a particular access terminal. The private access point 202 may associate two identifiers together to arrive at a single identifier for an access terminal. A conceptual table for a registration database 306 may include more than one column for hardware identifiers for a particular access terminal and/or more than one row for a particular access terminal. The private access point 202 may employ techniques that may, e.g., with respect to the same access terminal, translate one hardware identifier into another hardware identifier, produce a new hardware identifier (e.g., by hashing) from another hardware identifier, generate a new hardware identifier representative of one or more other hardware identifiers, or link two or more hardware identifiers together.

FIG. 5 is a diagram illustrating example content 500 of the table 400. This example assumes that registration database 306 is presently storing registrations for five access terminals, with respective identifiers A, B, C, D, and E. In a first row 516, a first authorized access terminal, that is presently registered on the private access point 202 for 1x communications only, has identifier A and has a corresponding 1x registration 502, but no corresponding DO registration. In a second row 518, a second authorized access terminal, that is presently registered on the private access point 202 for DO communications only, has identifier B and has a corresponding DO registration 504, but no corresponding 1x registration. In a third row 520, a third access terminal, that is presently registered on the private access point 202 for both 1x and DO communications, has identifier C and has a corresponding 1x registration 506 as well as a corresponding DO registration 508. In a fourth row 522, a fourth access terminal has identifier D and has a corresponding 1x registration 510 as well as a corresponding DO registration 512. In a fifth row 524, a fifth access terminal has identifier E and has a corresponding 1x registration 514, but no corresponding DO registration.

The registration database 306 may store DO registrations, 1x registrations, and identifiers. At any given moment, the registration database 306 may be said to include a first number of DO registrations, a second number of 1x registrations, and third number of identifiers. The third number of identifiers corresponds to a third number of authorized and registered access terminals that are authorized and registered on the private access point for either DO or 1x communications, or both. If the registration database 306 includes no registrations, the first, second, and third numbers are all equal to zero. In the example content 500 shown in FIG. 5, the first number of DO registrations would be equal to three (i.e., DO registrations 504, 508, 512), the second number of 1x registrations would be equal to four (i.e., 1x registrations 502, 506, 510, 514), and the third number of identifiers and corresponding third number of authorized and registered access terminals would be equal to five (i.e., access terminal identifiers A, B, C, D, and E). One DO registration (DO registration 504) in the content 500 has no corresponding 1x registration, and two 1x registrations (1x registration 502, 514) have no corresponding DO registration.

In an implementation, the registration database 306 may also store identifiers in addition to the third number of identifiers. The database 306 may include one or more identifiers for access terminals that have no corresponding DO or 1X registrations.

Many access terminals have been designed to determine and establish a connection with an access point via the 1xRTT protocol before determining and establishing a parallel data connection with the access point via the EV-DO protocol. Providers of wireless services have traditionally preferred that access terminals use the same provider's access points (but not necessarily the same access point) for 1x and DO communication. With the advent of private wireless networks it is advantageous for an access terminal to maintain a data connection via the EV-DO protocol with the same access point that the access terminal maintains a voice connection with via the 1xRTT protocol, so that if an access terminal switches 1xRTT protocol communication from one access point to another, then the access terminal should make a corresponding switch on the EV-DO protocol communication side.

It may be advantageous for access terminal 206 to maintain 1x and DO connections on the same private access point 202 because using the private access point 202 rather than the macro access point 108 may result in reduced rates and better wireless service for 1x and DO. Thus, once the access terminal 206 registers on the private access point 202 for 1x standard communications, it may in general be advantageous to have the access terminal 206 register on the private access point 202 for DO standard communications, rather than letting the access terminal 206 maintain communications with the macro access point 108.

Private access point addressing may be used in conjunction with a PRL to align communications on the 1x standard side of the access terminal 206 with communications on the DO standard side. For example, the PRL may be altered to include an association between private access point identifiers. The PRL association may be used to cause an access terminal that registers with a private access point for 1x communications to attempt to initiate communication with the private access point for DO communications instead of staying on the macro network.

Manufacturers, however, may be reluctant to alter PRLs in access terminals. For example, manufacturers may not associate a SID/NID identifier and a Subnet identifier for a private access point together in the PRL. In the absence of such an association, a DO beacon signal broadcast by the private access point 202 may be used to attract the access terminal 206 to the private access point 202 and thus align communications on the 1x standard side of the access terminal 206 with communications on the DO standard side.

While the private access point 202 may broadcast a 1x beacon signal to all access terminals in a particular area, the private access point 202 may also be configured to send unicast 1x messages as part of 1x beacon signals to specific authorized access terminals. For DO communications, sending unicast DO messages as part of DO beacon signals to specific authorized access terminals may not be possible because access terminal addresses may be set dynamically by the macro access point 108 so that the private access point 202 may not be aware of the access terminal addresses. Therefore, DO messages are generally broadcast globally in DO beacon signals to all access terminals within reach of the private access point 202.

Referring to FIGS. 3-4, the private access point 202 may be configured to achieve a state of the registration database 306 in which every authorized and registered access terminal that has a 1x registration has a matching DO registration in the database 306. The DO beacon signal broadcast by the private access point 202 may be used to attempt to achieve that state.

A DO beacon signal is typically a periodic signal that may be broadcast by the private access point 202 on all carrier frequencies used by (or, e.g., known by the private access point 202 to be used by) the macro access point 108. The macro access point 108 may use, e.g., carrier frequencies F1, F2, ..., FN for communication with access terminals. The private access point 202 typically uses a carrier frequency, e.g., F1, for servicing DO communications with access terminals. The private access point 202 generally may not broadcast the DO beacon signal on the carrier frequenc(ies) that the private access point 202 is using for DO communications. The DO beacon signal is used to redirect access terminals that may be presently listening to the macro access point 108 on one of the carrier frequencies F2, ..., FN used by the macro access point 108 for DO communications to the carrier frequency F1 of the private access point 202. If the access terminal hears the DO beacon signal and determines that the DO beacon signal is stronger than the signal the access terminal is listening to from the macro access point, the access terminal will switch to the carrier frequency that that the private access point 202 uses for DO communications (here F1). The redirected access terminals may then listen for a DO signal from the private access point 202 on the carrier frequency F1 of the private access point 202, as described above.

Figure 6A:
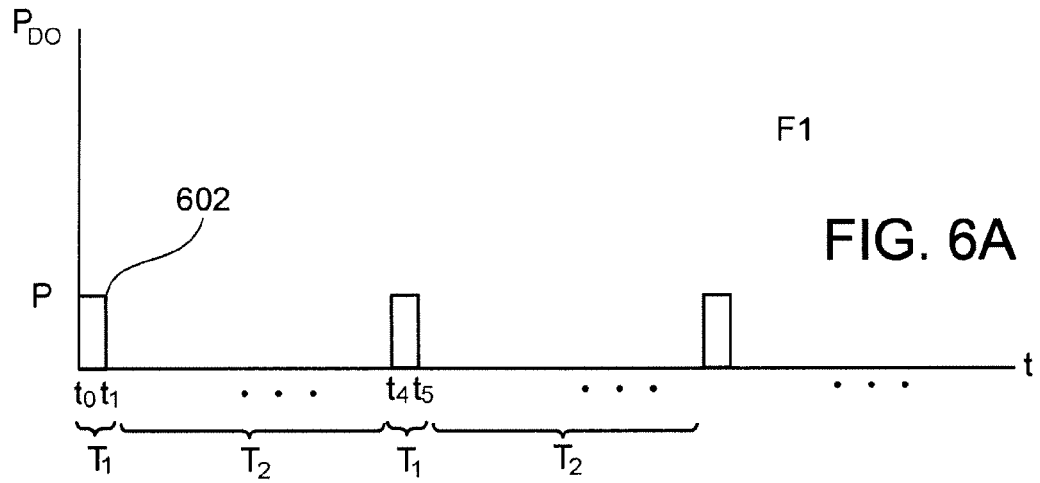
FIGS. 6A-6C are timing diagrams of a DO beacon signal.
Figure 6B:
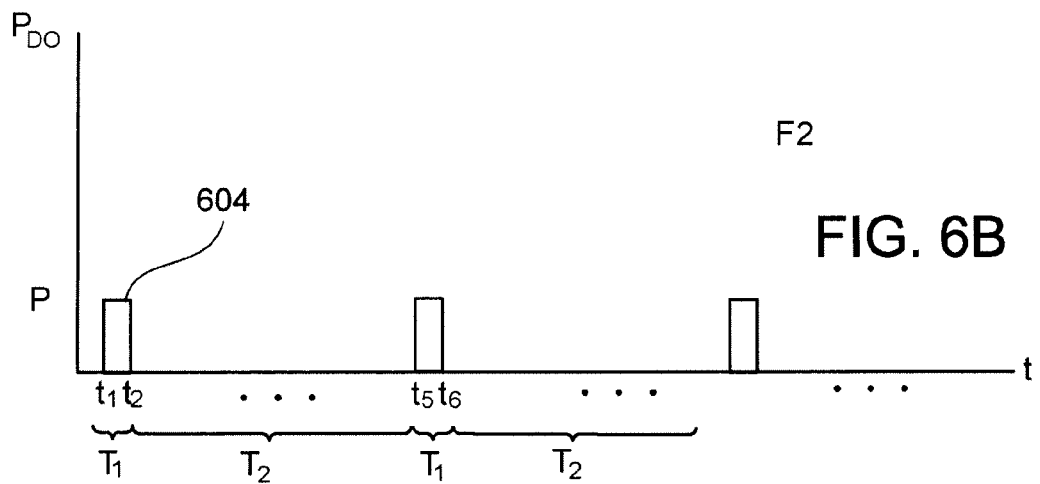
Figure 6C:
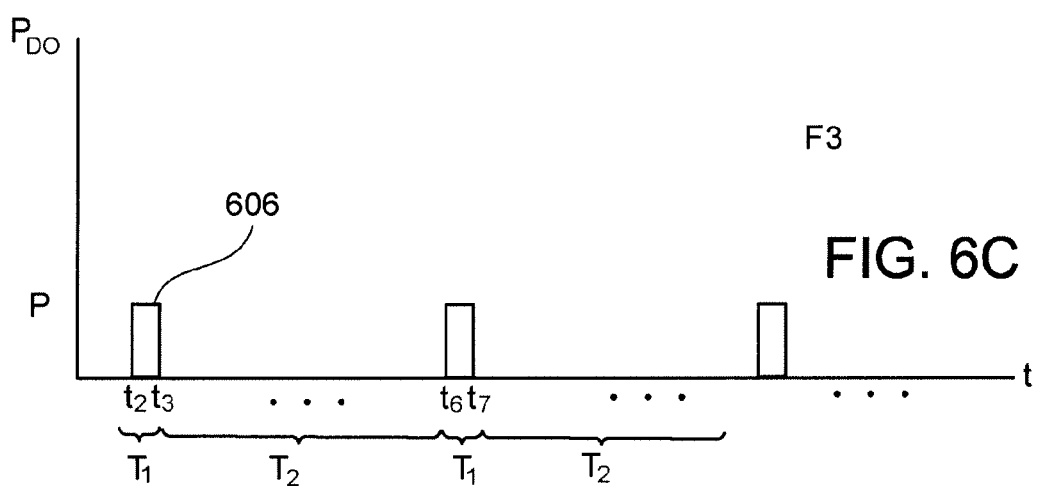

FIGS. 6A-6C are timing diagrams showing several periods of a time division multiplexing (TDM) DO beacon signal on three carrier frequencies used by the macro access point 108 for DO communications (here it is assumed, for example, that the macro access point 108 uses only three carrier frequencies for DO communications and that the private access point 202 uses another carrier frequency, e.g. F4, for DO communications). The TDM DO beacon signal switches from carrier frequency to carrier frequency at different time slots, as shown in FIGS. 6A-6C. FIGS. 6A, 6B, and 6C show the DO beacon signal on the carrier frequencies F1, F2, and F3, respectively. The DO beacon signal may be sent indefinitely by the private access point 202 so that the DO beacon signal may generally be transmitted on all frequencies in every period once it has been started, for an indefinite number of periods. The DO beacon signal is broadcast at a constant signal strength P.

At time $t_o$, the private access point 202 begins to transmit the DO beacon signal on the carrier frequency F1 at signal strength value P (see FIG. 6A). The DO beacon signal is sent on the carrier frequency F1 until time $t_1$, at which time the DO beacon signal is switched to the carrier frequency F2 (see FIGS. 6A-6B). The DO beacon signal is transmitted on the carrier frequency F2 until time $t_2$, at which time the private access point 202 switches the DO beacon signal to carrier frequency F3 (see FIGS. 6B-6C). The DO beacon signal is then transmitted on the carrier frequency F3 until time $t_3$ (see FIG. 6C), at which time no DO beacon signal is sent on any carrier frequency until time $t_4$ (see FIG. 6A). At time t4, the DO beacon signal is once again sent on the carrier frequency F1 (see FIG. 6C) and the cycle repeats.

The DO beacon signal is broadcast on a particular carrier frequency used by the macro access point 108 for a time period $T_1$, and is off on that frequency for a time period $T_2$, so that the period of the DO beacon signal on any carrier frequency is given by $T_1+T_2$. The values $T_1$ and $T_2$ may be selected through consideration of various factors. An access terminal may need to be listening for paging messages from the access point that it is communicating with, since access points may typically use paging messages to inform an access terminal about, e.g., an incoming telephone call. Thus, an access terminal that is idling on the macro access point 108 may need to be listening from time to time for paging messages from the macro access point 108. However, when the access terminal is listening to or for the DO beacon signal, the access terminal may miss opportunities to hear paging messages from the access terminal. Therefore, the DO beacon signal may be broadcast by the private access point 202 for relatively short period of time during each period of the signal, i.e., the DO beacon signal will have a relatively small duty cycle. The duty cycle D of the DO beacon signal (for a particular carrier frequency) may be a few percent, e.g., around 1 to 2 percent, or 0.01 to 0.02, although larger or smaller values are possible. Another factor that may be considered is the pulse width T1 of the DO beacon signal (for a particular carrier frequency). An access terminal in idle mode may listen for signals every few seconds. The DO beacon signal may need to be active on a particular carrier frequency long enough for the access terminal to hear the DO beacon signal, i.e., with a pulse width of, e.g., around 5 to 10 seconds, although longer or shorter periods of time are possible.

For a DO beacon signal, the period $T_1+T_2$ of the signal may be given by the pulse width $T_1$ divided by the duty cycle D. For, e.g., a pulse width of 10 seconds and a duty cycle of 0.02 (2 percent), the period $T_1+T_2$ of the DO beacon signal is 500 seconds (8 minutes and 20 seconds). For, e.g., a pulse width of 5 seconds and duty cycle of 0.01 (1 percent, the period of the DO beacon signal is the same value.

The DO beacon signal transmitted by the private access point 202 may be intended to attract authorized access terminals, such as access terminal 206, to the private access point 202. The DO beacon signal, however, may also attract unauthorized access terminals, such as access terminal 116, to the private access point 202. Since the DO beacon signal may be broadcast to all access terminals in range of the private access point 202, rather than unicast or multicast to select authorized access terminals, then DO beacon signal may in general be heard by unauthorized access terminals as well as authorized access terminals. If an access terminal (authorized or unauthorized) hears the DO beacon signal and determines that the DO beacon signal is stronger than the signal the access terminal is listening to (e.g., from the macro access point), the access terminal will be redirected to the carrier frequency of the private access point 202 for DO communications (e.g., by a redirect message in the DO beacon signal), where the unauthorized access terminals may hear a DO signal from the private access point 202.

Referring again to FIG. 3, and as described above, in contrast to the situation when an authorized access terminal 206 attempts to register with the private access point 202, when the unauthorized MAT 116 hears a DO signal from the private access point 202, the MAT 116 may send a DO registration message to the private access point 202. Upon receipt of the DO registration message, the private access point 202 may check the access list 304. Upon determining that the unauthorized MAT 116 is not on the access list 304, the private access point 202 may generally reject the registration message by sending a message to the MAT 116.

An unauthorized access terminal that has been rejected by the private access point 202 but that is still in range of the private access point 202, may hear the DO beacon signal again during, e.g., the next period or subsequent periods of the DO beacon signal. The private access point may once again reject the unauthorized access terminal. Repeated failed attempts to register by an unauthorized access terminal may drain the battery of the access terminal. For example, referring to FIG. 2, the access terminal 216 may be authorized on the private access point 212 in the neighboring home 212. The access terminal 216 may not be authorized on the private access point 202 but may be within range of the private access point 202 and may hear a DO beacon signal from the private access point 202. On a given night, the access terminal 216 may repeatedly fail to register on the private access point 202, and the access terminal 216 may have drained its battery by the next morning, for example.

FIG. 7 is a flow diagram showing an example process 700 of a private access point such as the private access point 202 of FIG. 2 as relates to starting and stopping transmission of a DO beacon signal. The private access point 202 may include the example implementation shown in FIG. 3, including memory 302, the access list 304, and the registration database 306. The registration database 306 may be expressed as a conceptual table 400 as shown in FIG. 4 and may store content in analogous fashion to the example content 500 illustrated in FIG. 5. In general, the private access point 202 may receive 1x and DO registration messages from authorized and unauthorized access terminals. The private access point 202 may store 1x registrations and DO registrations corresponding to registration messages received from authorized access terminals in the registration database 306.

Processing begins (702), for example, when the private access point 202 waits for triggering events to occur (704).

The private access point 202 determines (706) whether a first type of event has just occurred, i.e., whether a new 1x registration has been added to the registration database 306 and whether the new 1x registration has no matching DO registration in the registration database 306. The new 1x registration may correspond to a newly received 1x registration message from an access terminal. This type of event may be similar to the example shown in row 516 of FIG. 5, with an access terminal having identifier A and a newly added 1x registration 502 and no corresponding matching DO registration.

If a new 1x registration has just been added to the registration database 306 and the new 1x registration has no matching DO registration in the registration database 306, then the private access point 202 starts broadcasting (708) a DO beacon signal on all carrier frequencies known by the private access point 202 to be used by the macro access point 108. When a DO beacon signal pulse has been sent on all known macro carrier frequencies, the private access point 202 temporarily stops broadcasting the DO beacon signal and turns on and starts a timer (724). The timer may be used by the private access point 202 to track the elapsed time (up to a maximum time $T_{max}$) since a pulse of the DO beacon signal was last sent on any carrier frequency. Processing then returns to the private access point 202 waiting for triggering events to occur (704).

In an implementation, the private access point 202 may start broadcasting (708) a DO beacon signal only if the private access point 202 had not previously started broadcasting a DO beacon signal within the last X minutes. X may be five minutes, although other values are possible. If a DO beacon signal is already being broadcast, processing returns to the private access point 202 waiting for triggering events to occur (704).

If the private access point 202 determined at decision 706 that the first type of event did not just occur, then the private access point 202 determines (710) whether a second type of event has just occurred, i.e., whether a DO registration has just expired and been removed from the registration database 306 and whether a 1x registration previously matching the expired DO registration remains in the registration database 306. This event may be similar to the example shown in row 524 of FIG. 5, with an access terminal having identifier A and a 1x registration 514 without a corresponding matching DO registration (due to the DO registration having expired).

The EV-DO standard allows for DO registration validity periods. A DO registration may be valid for the duration of the validity period, after which the DO registration may expire and be removed from the registration database 306. DO registrations may be limited in duration because an access terminal that has been registered on the private access point 202 may return to listening to the macro access point 108. If the DO registration never expired, or expired after a long time, the private access point 202 may not know that the access terminal has moved back to listening to the macro access point 108, and there may be resources associated with the DO registration that may be tied up even after the access terminal had stopped listening to the private access point 202. A DO registration validity period allows the private access point 202 to determine that the access terminal has begun listening to the macro access point 202: if the DO registration expires, and the access terminal does not reregister (or attempt to reregister) on the private access point 202, then the private access point 202 has learned very quickly that the access terminal has returned to the macro access point 108 for DO communications. Thus, when a DO registration expires, and there is a 1x registration that matched the DO registration, the private access point 202 may use the DO beacon signal to try to redirect the access terminal back to the private access point 202.

An access terminal may renew the DO registration prior to, or following, the removal of the DO registration from the registration database 306. A renewal of the DO registration following the removal of the DO registration from the registration database 306 is the addition of a new DO registration to the database 306.

In an implementation, a DO registration validity period may be set at a duration of around a few minutes, although other values may be used.

One DO registration timer may be used for all DO registrations in the database 306. The DO registration timer may be initialized each time that any DO registration is added to the database 306 and/or any time that a DO registration is renewed. Each DO registration may have its own associated DO registration timer to mark the DO registration validity period for that DO registration. The associated DO registration timer may be initialized each time that the DO registration corresponding to the timer is added to the database 306 or is renewed. A DO registration timer may be initialized with a value of the DO registration validity period and may then count down to zero as time elapses. A DO registration timer may be initialized to zero and may count up toward the DO registration validity period as time elapses.

If a DO registration has just expired and been removed from the registration database 306 and a 1x registration previously matching the expired DO registration remains in the registration database 306, then the private access point 202 starts broadcasting (708) a DO beacon signal on all carrier frequencies known by the private access point 202 to be used by the macro access point 108. When a DO beacon signal pulse has been sent on all known macro carrier frequencies, the private access point 202 temporarily stops broadcasting the DO beacon signal and turns on and starts the timer (724), described in more detail above. Processing then returns to the private access point 202 waiting for triggering events to occur (704).

If the private access point 202 determined at decision 710 that the second type of event did not just occur, then the private access point 202 determines (712) whether a third type of event has just occurred, i.e., whether a new DO registration has just been added to the registration database 306. The new DO registration may correspond to a newly received DO registration message from an access terminal.

A "new" DO registration may include a renewal DO registration for a DO registration that expired from the data base. A "new" DO registration may not include a renewal DO registration for a DO registration that is still in the registration database and has not expired from the database. Once initialized, a DO registration timer (for, e.g., all DO registrations in the database 306) may then count down from the DO registration validity period to zero, or counts up from zero to the DO registration validity period, at which time any DO registrations associated with the DO registration timer expire. Initialization of the timer stops the timer from counting up or counting down, and resets the timer. In an implementation, a DO registration timer (for, e.g., all DO registration in the database 306) may be initialized each time that a new DO registration is added to the registration database 306. In an implementation, a DO registration timer (for, e.g., all DO registrations in the database 306) may be initialized each time that a new DO registration is added to the registration database 306 and each time that a DO registration is renewed.

If the private access point 202 determined at decision 712 that a new DO registration has just been added to the registration database 306, then the private access point 202 determines (714) whether every 1x registration in the registration database 306 has a respective matching DO registration in the registration database 306.

If every 1x registration in the registration database 306 has a respective matching DO registration in the registration database 306, then the private access point 202 stops broadcasting (716) the DO beacon signal and turns off the timer (described above). Processing then returns to the private access point 202 waiting for triggering events to occur (704).

If the private access point 202 determined at decision 712 that the third type of event did not just occur, then the private access point 202 determines (718) whether a fourth type of event has just occurred, i.e., whether a 1x registration has just expired and been removed from the registration database 306. This fourth type of event may also include a 1x registration being erased as a consequence of the private access point 202 redirecting the access terminal associated with the registration to the macro access point 108.

If a 1x registration has just expired and been removed from the registration database 306, or, e.g., a 1x registration has been erased from the registration database 306, then the private access point 202 determines (714) whether every 1x registration in the registration database 306 has a respective matching DO registration in the registration database 306.

If every 1x registration in the registration database 306 has a respective matching DO registration in the registration database 306, then the private access point 202 stops broadcasting (716) the DO beacon signal and turns off the timer (described above). Processing then returns to the private access point 202 waiting for triggering events to occur (704).

If the private access point 202 determines at decision 718 that a 1x registration has just expired and been removed from the registration database 306, then this may indicate that the access terminal corresponding to the 1x registration may be listening to the macro access point 108 for 1x communications. If the private access point 202 further determines that a matching DO registration remains in the database, then the private access point 202 may send (not shown) a redirect message to cause the access terminal corresponding to the expired 1x registration and the stored DO registration to switch to a carrier frequency used by the macro access point 108 for DO communications, so that the DO registration in the registration database 306 will expire.

If the private access point 202 determined at decision 718 that the fourth type of event did not just occur, then the private access point 202 determines (720) whether the timer has just reached a maximum value $T_{max}$.

If the timer has just reached the maximum value $T_{max}$, then the private access point 202 resumes broadcasting (722) the DO beacon signal on all carrier frequencies known by the private access point 202 to be used by the macro access point 108. When a DO beacon signal pulse has been sent on all known macro carrier frequencies, the private access point 202 temporarily stops broadcasting the DO beacon signal and turns on and starts the timer (726). Processing then returns to the private access point 202 waiting for triggering events to occur (704).

If the time has not reached the maximum value $T_{max}$, then processing returns to the private access point 202 waiting for triggering events to occur (704).

Rather than, or in addition to, maintaining a DO beacon signal at a constant signal strength or power, as shown, e.g., in FIGS. 6A-6C, the private access point 202 may adjust (e.g., increase) the DO beacon signal over time. Trying to reduce a number of unauthorized access terminals responding to a DO beacon signal over time may involve techniques such as operating the DO beacon signal for less time, turning the DO beacon signal on when the DO beacon signal may be needed and off when the DO beacon signal may not be needed, initially transmitting the DO beacon signal at a minimum signal strength value and progressively increasing the signal strength of the DO beacon signal over time, or some combination of these techniques.

Referring to FIG. 2, the private access point 202 may be configured to attract the authorized access terminal 206, and, if possible, to do so without attracting the unauthorized access terminal 116 or the access terminal 216, which may not be authorized to communicate with the private access point 202. The private access point 202 may store a 1x registration for the access terminal 206 and the access terminal may be listening to the private access point 202 for 1x communications, but even in such a situation, the private access point 202 may not in general know the location of the access terminal 206, even though the access terminal is probably nearby. The access terminal 206 may not be communicating with the private access point 202 for DO, but rather may be listening to the macro access point 108 on one of the carrier frequencies used by the macro access point 108. As described above, in order to attract the access terminal 206, the private access point 202 may broadcast a DO beacon signal on the carrier frequencies known by the private access point 202 to be used by the macro access point 108. In order for the access terminal 206 to switch to (or remain on) the carrier frequency that the private access point 202 uses for DO communications, the access terminal 206 may need to hear the DO beacon signal from the private access point 202 and determine that the DO beacon signal is stronger than the signal the access terminal 206 is listening to from the macro access point 108. The private access point 202 may thus attempt to send a DO beacon signal that exceeds a DO signal from the macro access point 108.

The private access point 202 may generally be capable of detecting signals from the macro access point 108. The private access point 202 may use the signal strength of these signals, plus an offset, to infer a signal strength at which the access terminal 206 (which is expected to be within range of the private access point, due to the existing 1x registration) would be expected to hear and select the DO beacon signal. In this way, the private access point 202 may determine a minimum signal strength at which to send the DO beacon signal. Sending the DO beacon signal at the minimum signal strength may or may not be successful in attracting the access terminal 206 to the private access point 202, but may be used as a starting point for the DO beacon signal. If the private access point 202 does not receive a registration request from the access terminal 206, the private access point 202 may then increase the signal strength of the DO beacon signal from an initial (e.g., minimum) signal strength to another signal strength value. The private access point 202 may double the signal strength of the DO beacon signal, i.e., increase the power by 3 dB. The private access point 202 may progressively increase the signal strength of the DO beacon signal by one or more steps. The private access point 202 may progressively double the signal strength of the DO beacon signal, i.e., progressively increase the power by 3 dB with each progression. The signal strength of the DO beacon signal may be doubled N times. N may vary from 0 to a higher value, such as eight, with N=8 representing a 24 dB increase in signal strength. Other values of N may be used. The private access point 202 may increase the signal strength of the DO beacon signal by different step values, and the private access point 202 need not follow a linear progression in increasing the signal strength of the DO beacon signal. The private access point 202 may increase a signal strength of the DO beacon signal in steps from a first signal strength value up to a second signal strength value. The first signal strength value may exceed any minimum signal strength value, while the second signal strength may be less than any maximum signal strength value.

Figure 8A:
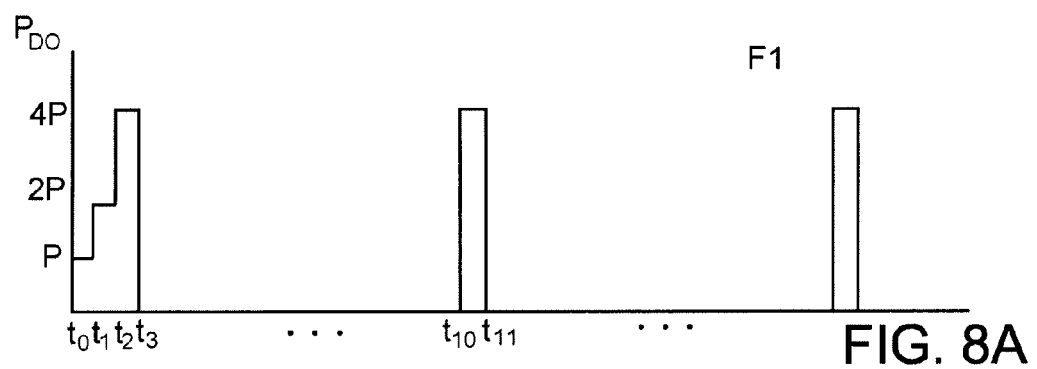
FIGS. 8A-8C are timing diagrams of a DO beacon signal.
Figure 8B:
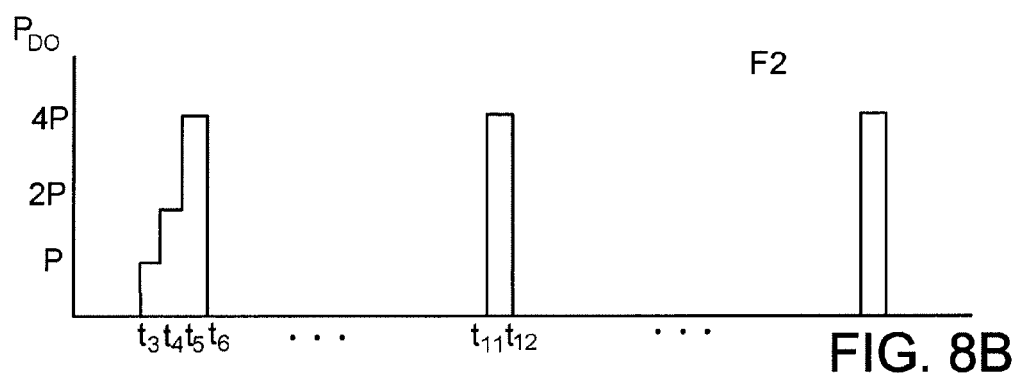
Figure 8C:
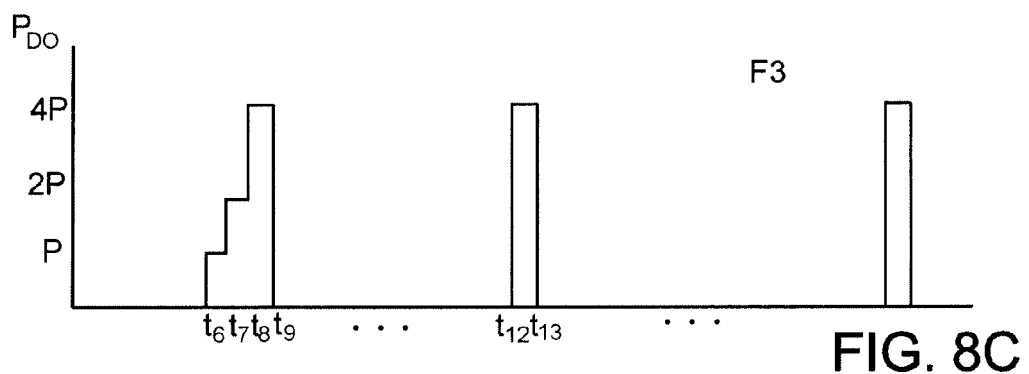

FIGS. 8A-8C are timing diagrams showing several periods of a TDM DO beacon signal on three carrier frequencies used by the macro access point 108 for DO communications (here it is assumed that the macro access point 108 uses only three carrier frequencies for DO communications). The TDM DO beacon signal switches from carrier frequency to carrier frequency at different time slots, as shown in FIGS. 8A-8C. FIGS. 8A, 8B, and 8C show the DO beacon signal on the carrier frequencies F1, F2, and F3, respectively.

In a first period of the DO beacon signal, on each of the three carrier frequencies, the DO beacon signal is progressively increased from a signal strength value P to a signal strength value 2 P (double the strength of P) and then to a signal strength value 4 P (double the strength of 2 P). In this example DO beacon signal, there are two increases, with each increase doubling the signal strength of the DO beacon signal, i.e., increasing the power by 3 dB. In general, although two increases per carrier frequency are shown in FIGS. 8A-8C, up to, e.g., eight increases that double the power of the DO beacon signal may be used. Of course, the DO beacon signal may be increased at different increments than would result from doubling the signal strength.

In subsequent periods of the DO beacon signal, on each of the three carrier frequencies, the DO beacon signal may be transmitted at the signal strength value 4 P. In this event, the DO beacon signal has a reduced duty cycle in the subsequent periods than in the first period. Other techniques may be used in subsequent periods. The private access point 202 may transmit the DO beacon signal on each carrier frequency at an initial signal strength value and progressively increase (e.g., double, or triple) the signal strength one or more times. The private access point 202 may transmit the DO beacon signal on each carrier frequency at an, e.g., intermediate signal strength value that is greater than the lowest signal strength value transmitted in the first period or that is less than a highest signal strength value used in the first period. The private access point 202 may increase the signal strength from the DO beacon signal from the intermediate signal strength value. Generally, any of a vast number of permutations for a DO beacon signal may be used.

Referring to FIGS. 8A-8C, at time $t_o$, the private access point 202 begins to transmit the DO beacon signal on the carrier frequency F1 at signal strength value P (see FIG. 8A). At time $t_1$, the private access point 202 increases the signal strength of the DO beacon signal to a signal strength value 2 P on the same carrier frequency F1. At time $t_2$, the private access point 202 increases the signal strength of the DO beacon signal to a signal strength value 4 P on the same carrier frequency F1. The DO beacon signal is sent on the carrier frequency F1 until time $t_3$, at which time the DO beacon signal is switched to the carrier frequency F2 and transmitted at the signal strength value P (see FIGS. 8A-8B). At time $t_4$, the private access point 202 increases the signal strength of the DO beacon signal to the signal strength value 2 P on the same carrier frequency F2. At time $t_5$, the private access point 202 increases the signal strength of the DO beacon signal to the signal strength value 4 P on the same carrier frequency F1. The DO beacon signal is transmitted on the carrier frequency F2 until time $t_6$, at which time the private access point 202 switches the DO beacon signal to carrier frequency F3 (see FIGS. 8B-8C). Over the time period from $t_6$ to $t_9$, the DO beacon signal is increased from the signal strength value P to the value 2 P and then from the value 2 P to the value 4 P on the carrier frequency F3 (see FIG. 8C). At time $t_9$, the DO beacon signal is temporarily turned off and no DO beacon signal is sent on any carrier frequency until time too (see FIG. 8A). At time $t_{10}$, the DO beacon signal is transmitted at the signal strength value 4 P on the carrier frequency F1. At time $t_{11}$, the DO beacon signal is switched to the carrier frequency F2 and transmitted at the signal strength value 4 P (see FIGS. 8A-8B). At time $t_{12}$, the DO beacon signal is switched to the carrier frequency F3 and transmitted at the signal strength value 4 P (see FIGS. 8B-8C) with the cycle repeating itself in subsequent periods of the DO beacon signal on the carrier frequencies.

Figure 9A:
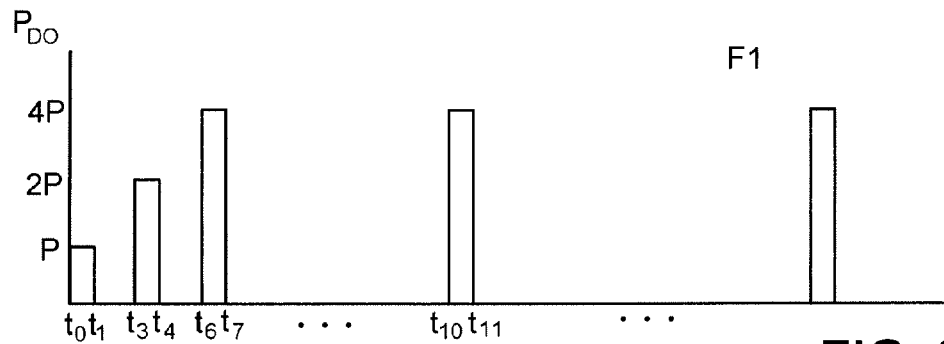
FIGS. 9A-9C are timing diagrams of a DO beacon signal.
Figure 9B:
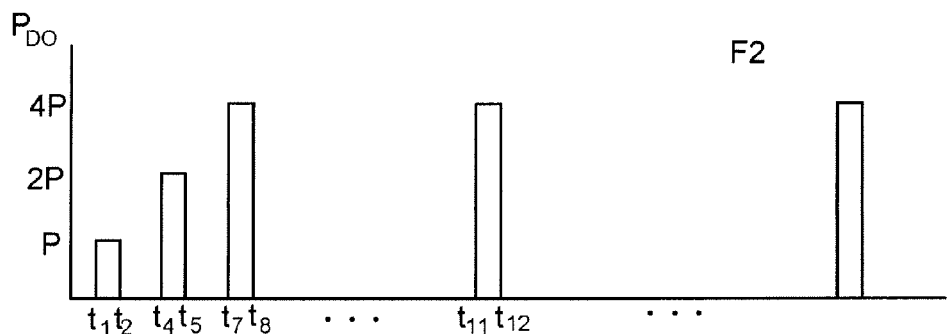
Figure 9C:
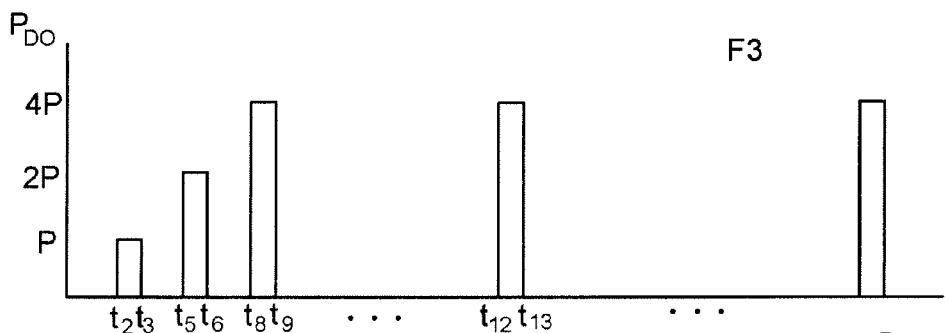

FIGS. 9A-9C are timing diagrams showing several periods of a TDM DO beacon signal on three carrier frequencies used by the macro access point 108 for DO communications (here it is assumed that the macro access point 108 uses only three carrier frequencies for DO communications). The TDM DO beacon signal switches from carrier frequency to carrier frequency at different time slots, as shown in FIGS. 9A-9C. FIGS. 9A, 9B, and 9C show the DO beacon signal on the carrier frequencies F1, F2, and F3, respectively.

In a first period of the DO beacon signal, on each of the three carrier frequencies, the DO beacon signal is sent at a signal strength value P successively on each of the three carrier frequencies. Then, still in the first period, the DO beacon signal is increased from the signal strength value P to a signal strength value 2 P (double the strength of P) and sent successively on each of the three carrier frequencies. Then, still in the first period, the DO beacon signal is increased from the signal strength value 2 P to a signal strength value 4 P (double the strength of 2 P) and sent successively on each of the three carrier frequencies. In this example DO beacon signal, there are two increases, with each increase doubling the signal strength of the DO beacon signal, i.e., increasing the power by 3 dB. In general, although two increases per carrier frequency are shown in FIGS. 8A-8C, up to e.g., eight increases that double the power of the DO beacon signal may be used. Of course, the DO beacon signal may be increased at different increments than would result from doubling the signal strength.

In subsequent periods of the DO beacon signal, the DO beacon signal may be transmitted in a similar manner to that shown in FIGS. 8A-8C. As described with respect to FIGS. 8A-8C, other techniques may be used in subsequent periods. Generally, any of a vast number of permutations for a DO beacon signal may be used.

Referring to FIGS. 9A-9C, at time to, the private access point 202 begins to transmit the DO beacon signal on the carrier frequency F1 at signal strength value P (see FIG. 9A). At time $t_1$, the private access point 202 switches the DO beacon signal to the carrier frequency F2 and transmits the DO beacon signal at the signal strength value P (see FIGS. 9A-9B). At time $t_2$, the DO beacon signal is switched to the carrier frequency F3 and transmitted at the signal strength value P (see FIGS. 9B-9C). At time $t_3$, the private access point 202 switches the DO beacon signal to the carrier frequency F1 and transmits the DO beacon signal at an increased signal strength, a signal strength value 2 P (see FIG. 9C). At time $t_4$, the private access point 202 switches the DO beacon signal to the carrier frequency F2 and transmits the DO beacon signal at the signal strength value 2 P (see FIGS. 9A-9B). At time $t_5$, the DO beacon signal is switched to the carrier frequency F3 and transmitted at the signal strength value 2 P (see FIGS. 9B-9C). At time $t_6$, the private access point 202 switches the DO beacon signal to the carrier frequency F1 and transmits the DO beacon signal at an increased signal strength, a signal strength value 4 P (see FIG. 9C). At time $t_7$, the private access point 202 switches the DO beacon signal to the carrier frequency F2 and transmits the DO beacon signal at the signal strength value 4 P (see FIGS. 9A-9B). At time $t_8$, the DO beacon signal is switched to the carrier frequency F3 and transmitted at the signal strength value 4 P (see FIGS. 9B-9C). At time $t_9$, the private access point 202 switches the DO beacon signal to the carrier frequency F1 and transmits the DO beacon signal at an increased signal strength, a signal strength value 4 P (see FIG. 9C). At time $t_9$, the DO beacon signal is temporarily turned off and no DO beacon signal is sent on any carrier frequency until time $t_{10}$ (see FIG. 9A). At time $t_{10}$, the DO beacon signal is transmitted at the signal strength value 4 P on the carrier frequency F1. At time $t_{11}$, the DO beacon signal is switched to the carrier frequency F2 and transmitted at the signal strength value 4 P (see FIGS. 9A-9B). At time $t_{12}$, the DO beacon signal is switched to the carrier frequency F3 and transmitted at the signal strength value 4 P (see FIGS. 9B-9C) with the cycle repeating itself in subsequent periods of the DO beacon signal on the carrier frequencies.

FIG. 10 is a flow diagram showing an example process 1000 of a private access point such as the private access point 202 of FIG. 2 as relates to starting and stopping transmission of a DO beacon signal, e.g., a signal that is progressively increased in one or more periods of the DO beacon signal.

Processing begins (1002), for example, when the private access point 202 waits for triggering events to occur (1004).

The private access point 202 determines (1006) whether a first type of event has just occurred, i.e., whether a new 1x registration has been added to the registration database 306 and whether the new 1x registration has no matching DO registration in the registration database 306.

If a new 1x registration has just been added to the registration database 306 and the new 1x registration has no matching DO registration in the registration database 306, then the private access point 202 starts broadcasting (1008) a DO beacon signal on all carrier frequencies known by the private access point 202 to be used by the macro access point 108. In a first period of the DO beacon signal, the signal strength of the DO beacon signal may be increased (e.g., doubled) N times. FIGS. 8A-8C and FIGS. 9A-9C, in which N=2, show example increases in DO beacon signals that may occur in a first period of the DO beacon signal on all known macro carrier frequencies. While the DO beacon signal is being transmitted in the first period, processing returns to the private access point 202 waiting for triggering events to occur (1004). Transmission of the DO beacon signal during the first period may continue through numerous possible iterations of the process 1000, depending on whether certain events (described below) do or do not occur.

In an implementation, the private access point 202 may start broadcasting (1008) a DO beacon signal only if the private access point 202 had not previously started broadcasting a DO beacon signal within the last X minutes. X may be five minutes, although other values are possible. If a DO beacon signal is already being broadcast, processing returns to the private access point 202 waiting for triggering events to occur (1004).

If the private access point 202 determined at decision 1006 that the first type of event did not just occur, then the private access point 202 determines (1010) whether a second type of event has just occurred, i.e., whether a DO registration has just expired and been removed from the registration database 306 and whether a 1x registration previously matching the expired DO registration remains in the registration database 306.

As described above, a DO registration may be valid for the duration of a DO registration validity period, after which the DO registration may expire and be removed from the registration database 306. In an implementation, a DO registration validity period may be set at a duration of around a few minutes, although other values may be used.

If a DO registration has just expired and been removed from the registration database 306 and a 1x registration previously matching the expired DO registration remains in the registration database 306, then the private access point 202 starts broadcasting (1008) a DO beacon signal on all carrier frequencies known by the private access point 202 to be used by the macro access point 108. In a first period of the DO beacon signal, the signal strength of the DO beacon signal may be increased (e.g., doubled) N times. FIGS. 8A-8C and FIGS. 9A-9C, in which N=2, show example increases in DO beacon signals that may occur in a first period of the DO beacon signal on all known macro carrier frequencies. While the DO beacon signal is being transmitted in the first period, processing returns to the private access point 202 waiting for triggering events to occur (1004). Transmission of the DO beacon signal during the first period may continue through numerous possible iterations of the process 1000, depending on whether certain events (described below) do or do not occur.

If the private access point 202 determined at decision 1010 that the second type of event did not just occur, then the private access point 202 determines (1012) whether a third type of event has just occurred, i.e., whether a new DO registration has just been added to the registration database 306.

As described above, a "new" DO registration may include a renewal DO registration for a DO registration that expired from the data base. A "new" DO registration may not include a renewal DO registration for a DO registration that is still in the registration database and has not expired from the database. Once initialized, a DO registration timer (for, e.g., all DO registrations in the database 306) may then count down from the DO registration validity period to zero, or counts up from zero to the DO registration validity period, at which time any DO registrations associated with the DO registration timer expire. Initialization of the timer stops the timer from counting up or counting down, and resets the timer. In an implementation, a DO registration timer (for, e.g., all DO registration in the database 306) may be initialized each time that a new DO registration is added to the registration database 306. In an implementation, a DO registration timer (for, e.g., all DO registrations in the database 306) may be initialized each time that a new DO registration is added to the registration database 306 and each time that a DO registration is renewed.

If the private access point 202 determined at decision 1012 that a new DO registration has just been added to the registration database 306, then the private access point 202 determines (1014) whether every 1x registration in the registration database 306 has a respective matching DO registration in the registration database 306.

If every 1x registration in the registration database 306 has a respective matching DO registration in the registration database 306, then the private access point 202 stops broadcasting (1016) the DO beacon signal and turns off a timer. The timer may be used by the private access point 202 to track the elapsed time (up to a maximum time $T_{max}$) since a pulse of the DO beacon signal was last sent on any carrier frequency. Processing then returns to the private access point 202 waiting for triggering events to occur (1004).

If the private access point 202 determined at decision 1012 that the third type of event did not just occur, then the private access point 202 determines (1018) whether a fourth type of event has just occurred, i.e., whether a 1x registration has just expired and been removed from the registration database 306. This fourth type of event may also include a 1x registration being erased as a consequence of the private access point 202 redirecting the access terminal associated with the registration to the macro access point 108.

If a 1x registration has just expired and been removed from the registration database 306, or, e.g., a 1x registration has been erased from the registration database 306, then the private access point 202 determines (1014) whether every 1x registration in the registration database 306 has a respective matching DO registration in the registration database 306.

If every 1x registration in the registration database 306 has a respective matching DO registration in the registration database 306, then the private access point 202 stops broadcasting (1016) the DO beacon signal and turns off the timer (described above). Processing then returns to the private access point 202 waiting for triggering events to occur (1004).

If the private access point 202 determines at decision 1018 that a 1x registration has just expired and been removed from the registration database 306, then this may indicate that the access terminal corresponding to the 1x registration may be listening to the macro access point 108 for 1x communications. If the private access point 202 further determines that a matching DO registration remains in the database, then the private access point 202 may send (not shown) a redirect message to cause the access terminal corresponding to the expired 1x registration and the stored DO registration to switch to a carrier frequency used by the macro access point 108 for DO communications, so that the DO registration in the registration database 306 will expire.

If the private access point 202 determined at decision 1018 that the fourth type of event did not just occur, then the private access point 202 determines (1020) whether a fifth type of event has just occurred, i.e., whether all pulses of the DO beacon signal intended to be sent by the private access point 202 in a particular period of the DO beacon signal have just been broadcast on all known macro carrier frequencies. With reference to the example DO beacon signals shown in FIGS. 8A-8C and FIGS. 9A-9C, this event would occur at e.g., times $t_9$ and $t_{13}$ (and possible subsequent times, if the DO beacon signal is still being broadcast) of FIGS. 8C and 9C. Note that the private access point 202 may not reach these points because, depending on which events did or did not occur, e.g., broadcasting of the DO beacon signal may have been stopped prior to, e.g., times $t_9$ and $t_{13}$ (1016).

If all pulses of the DO beacon signal intended to be sent by the private access point 202 in a particular period of the DO beacon signal have just been broadcast on all known macro carrier frequencies, then the private access point 202 temporarily stops broadcasting the DO beacon signal and turns on and starts a timer (1022). The timer may be used by the private access point 202 to track the elapsed time (up to a maximum time $T_{max}$) since a pulse of the DO beacon signal was last sent on any carrier frequency. Processing then returns to the private access point 202 waiting for triggering events to occur (1004).

If the private access point 202 determined at decision 1020 that the fifth type of event did not just occur, then the private access point 202 determines (1024) whether the timer has just reached a maximum value $T_{max}$.

If the timer has just reached the maximum value $T_{max}$, then the private access point 202 resumes broadcasting (1026) the DO beacon signal on all carrier frequencies known by the private access point 202 to be used by the macro access point 108. Processing then returns to the private access point 202 waiting for triggering events to occur (1004).

In the periods of the DO beacon signal following a first period, the DO beacon signal may be transmitted (1026) in a similar manner to that shown in FIGS. 8A-8C and FIGS. 9A-9D. Other techniques, e.g., broadcasting at a constant signal strength, broadcasting at a higher signal strength that used initially in a first period of the DO beacon signal, increasing the signal strength, may be used in subsequent periods, as described with reference to FIGS. 8A-8C. Generally, any of a vast number of permutations for a DO beacon signal may be used.

If the time has not reached the maximum value $T_{max}$, then processing returns to the private access point 202 waiting for triggering events to occur (1004).

Figure 11:
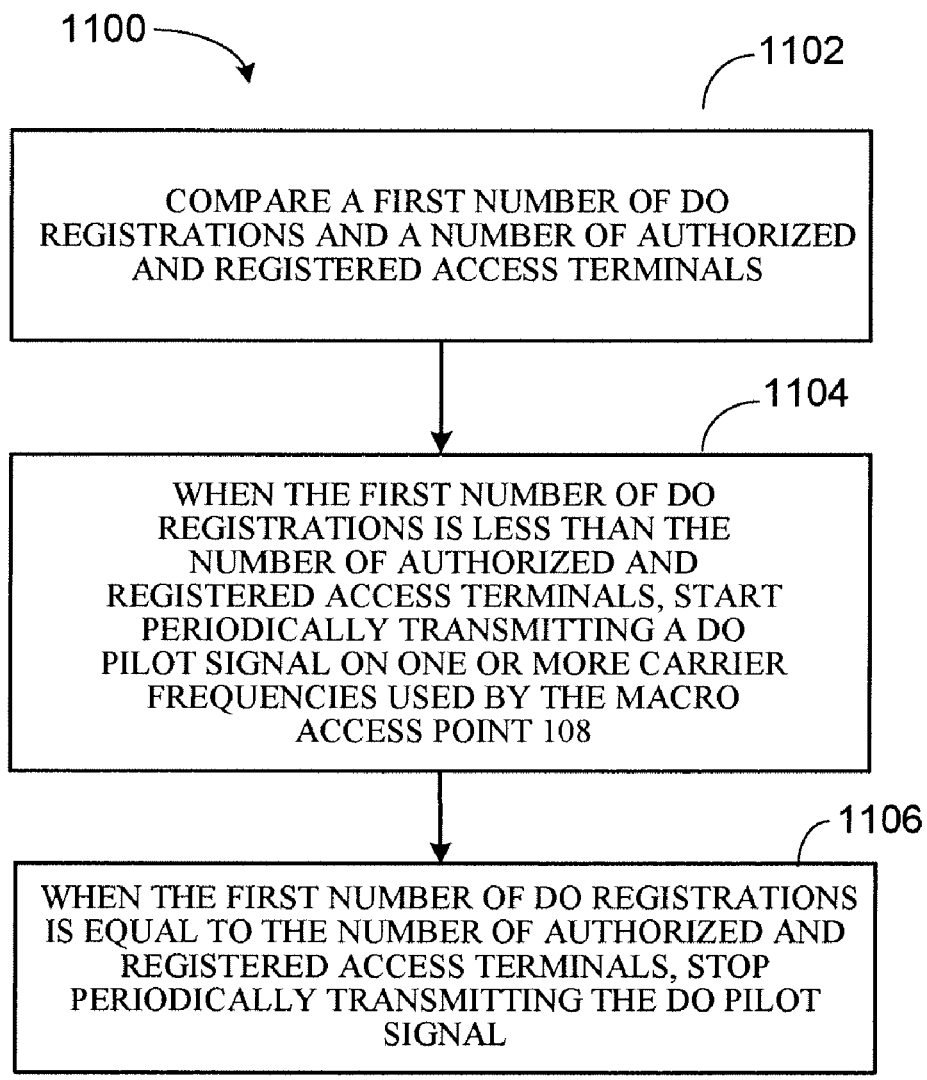
FIG. 11 is a flow diagram showing an example process of a private access point.

FIG. 11 is a flow diagram showing an example process 1100 of a private access point such as the private access point 202 of FIG. 2 that may be configured to reduce a number of unauthorized access terminals attempting to register on the private access point. The private access point 202 may be configured to communicate via a first air interface standard, e.g., EV-DO (DO), and via a second air interface standard, e.g., 1xRTT (1x). The private access point 202 may be configured to communicate via one or more other air interface standards (e.g., third and fourth air interface standards). As shown in FIG. 3, the private access point 202 may include memory 302. The memory 302 may be configured to store (e.g., in a registration database 306) first air interface standard registrations (e.g., DO registrations) and second air interface standard registrations (e.g., 1x registrations). The memory 302 may be further configured to store other air interface standard registrations (e.g., third and fourth air interface standard registrations).

Generally, authorized access terminals such as the access terminal 206 may be registered on the private access point 202 for communications according to at least one air interface standard of a set of air interface standards. If the set of air interface standards includes a first air interface standard (e.g., DO) and a second air interface standard (e.g., 1x), then any authorized and registered access terminal may, depending on how the access terminal is registered at any given moment, be authorized and registered for first air interface standard communications only, second air interface standard communications only, or both first air interface standard communications and second air interface standard communications.

If the set of air interface standards includes a first air interface standard (e.g., DO), a second air interface standard (e.g., 1x), and one or more other air interface standards such as a third and a fourth air interface standard, numerous possibilities and combinations of registrations are possible for a given authorized and registered access terminal, depending on how the access terminal is registered at any given moment. The registration database 306 may store, e.g., first and third air interface standard registrations corresponding to a first access terminal, a second air interface registration corresponding to a second access terminal, and second and fourth air interface standard registrations corresponding to a third access terminal.

The registration database 306 may store DO registrations, 1x registrations, and identifiers. As described above, at any given moment, the registration database 306 may be said to include a first number of DO registrations, a second number of 1x registrations, and third number of identifiers. The third number of identifiers corresponds to a third number of authorized and registered access terminals that are authorized and registered on the private access point for either DO or 1x communications, or both. If the registration database 306 includes no registrations, the first, second, and third numbers are all equal to zero. As described above, the registration database 306 may be expressed as the conceptual table 400 of FIG. 4.

The registration database 306 may store the first, second, and third numbers themselves in addition to the DO registrations, the 1x registrations and the identifiers. In some implementations, the registration database 306 may not store the first, second, and third numbers themselves and may only store the DO registrations, the 1x registrations, and the identifiers. The first, second, and third numbers may be tracked by a processor on the private access point 202. In some implementations, the private access point 202 may not actually keep track of or compare the first, second, and third numbers, but may perform functions equivalent to tracking or comparing the first, second, and third numbers.

Processing in FIG. 11 begins, for example, when the private access point 202 compares (1102) the first number of DO registrations in the registration database 306 and the third number of authorized and registered access terminals.

The private access point 202 may use other techniques to determine whether the first number of DO registrations is less than or equal to the third number of authorized and registered access terminals. The private access point 202 may compare the first number of DO registrations with the second number of 1x registrations. The private access point 202 may compare a set of DO registrations with a set of 1x registrations, or a set of authorized and registered access terminals, or both. The private access point 202 may compare sizes of sets, or compare sets to determine whether sets overlap with one another, or include one another.

Processing may also include storing (not shown in FIG. 11) (e.g., in a registration database 306) in the memory 302 first air interface standard registrations (e.g., DO registrations) and second air interface standard registrations (e.g., 1x registrations).

When the first number of DO registrations is less than the third number authorized and registered access terminals, the private access point 202 starts periodically transmitting (1104) a beacon signal on one or more carrier frequencies used by the macro access point 108. The beacon signal corresponds to DO, e.g., the beacon signal is a DO beacon signal. The private access point 202 generally may not send a beacon signal on a carrier frequency that the private access point 202 is using for DO communications, even if that carrier frequency is a carrier frequency used by the macro access point 108.

The private access point 202 may start periodically transmitting a beacon signal when the first number of DO registrations is less than the second number of 1x registrations.

When the first number of DO registrations is equal to the third number of authorized and registered access terminals and the first number of DO registrations is greater than or equal to the second number of 1x registrations, the private access point 202 stops periodically transmitting the DO beacon signal.

The private access point 202 may stop periodically transmitting the DO beacon signal when the first number of DO registrations is equal to the third number of authorized and registered access terminals.

An example illustrating an instance where a first number of DO registrations is less than a third number of authorized and registered access terminals is shown in FIG. 5. The first number of DO registrations is also less than a second number of 1x registrations. In the example content 500 of the table 400, the first number of DO registrations would be equal to three (i.e., DO registrations 504, 508, 512), the second number of 1x registrations would be equal to four (i.e., 1x registrations 502, 506, 510, 514), and the third number of identifiers and corresponding authorized and registered access terminals would be equal to five (i.e., access terminal identifiers A, B, C, D, and E). One DO registration (DO registration 504) in the content 500 has no corresponding 1x registration, and two 1x registrations (1x registration 502, 514) have no corresponding DO registration.

If the first number of DO registrations has just become less than the third number of authorized and registered access terminals (e.g., due to a 1x registration being added to, or a DO registration expiring from, the registration database 306), the private access point 202 may then start periodically transmitting (1104) the DO beacon signal on one or more carrier frequencies used by the macro access point 108, e.g., the known macro carrier frequencies for DO.

If the first number of DO registrations is less than the third number of authorized and registered access terminals, the private access point 202 may start periodically transmitting (1104) the DO beacon signal on one or more carrier frequencies used by the macro access point 108, e.g., the known macro carrier frequencies for DO, assuming, e.g., that the private access point 202 was not already transmitting the DO beacon signal, in which case periodically transmission had already started. The private access point 202 may start periodically transmitting (1104) each time a change occurs to the registration database 306, and, following the change, the first number of DO registrations is less than the third number of authorized and registered access terminals, even if the first number of DO registrations was less than the third number of authorized and registered access terminals prior to the change. The private access point 202 may start periodically transmitting (1104) each time a change occurs to the registration database 306 that causes the first number of DO registrations to become less than the third number of authorized and registered access terminals. That is, the private access point 202 may start periodically transmitting the beacon signal beginning only each time that the first number of DO registrations becomes less than the third number of authorized and registered access terminals.

Figure 12:
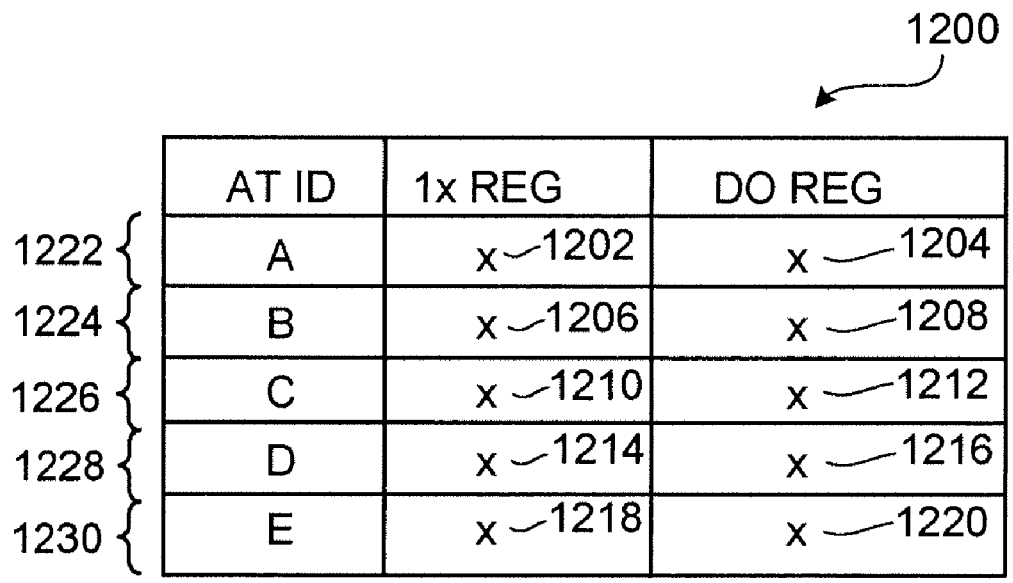
FIG. 12 is a diagram illustrating example content of the table of FIG. 4.

An example illustrating an instance where a first number of DO registrations is equal to a third number of authorized and registered access terminals is shown in FIG. 12. FIG. 12 is a diagram illustrating example content 1200 of the table 400 (of FIG. 4). In this example, the registration database 306 is presently storing registrations for five access terminals, with respective identifiers A, B, C, D, and E stored in respective rows 1222, 1224, 1226, 1228, 1230. Each row 1222, 1224, 1226, 1228, 1230 has a 1x registration matching a DO registration. For example, in a first row 1222, a first authorized access terminal, that is presently registered on the private access point 202 for both 1x and DO communications, has identifier A and has a corresponding 1x registration 1202 and a corresponding DO registration 1204. The other rows 1224, 1226, 1228, 1230 similarly include access terminal identifiers with corresponding matching 1x and DO registrations.

Thus, in the example content 1200 of the table 400, the first number of DO registrations would be equal to five (i.e., DO registrations 1204, 1208, 1212, 1216, 1220), the second number of 1x registrations would be equal to five (i.e., 1x registrations 1202, 1206, 1210, 1214, 1218), and the third number of identifiers and corresponding authorized and registered access terminals would be equal to five (i.e., access terminal identifiers A, B, C, D, and E).

Figure 13:
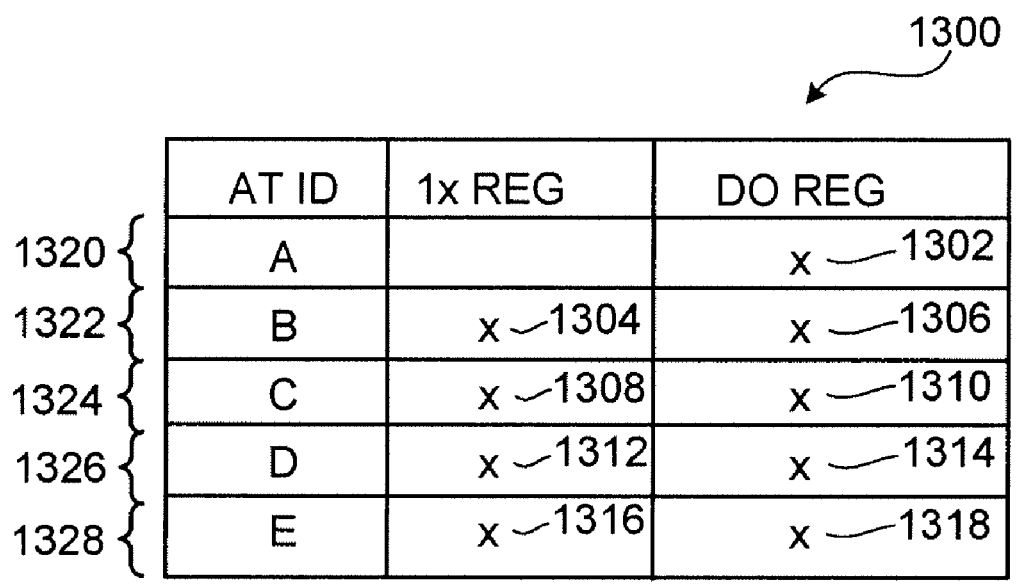
FIG. 13 is a diagram illustrating example content of the table of FIG. 4.

An example illustrating an instance where a first number of DO registrations is equal to a third number of authorized and registered access terminals, and the first number of DO registrations is greater than a second number of 1x registrations, is shown in FIG. 13. FIG. 12 is a diagram illustrating example content 1300 of the table 400 (of FIG. 4). In this example, the registration database 306 is presently storing registrations for five access terminals, with respective identifiers A, B, C, D, and E stored in respective rows 1320, 1322, 1324, 1326, 1328. While each of the four lowest rows 1322, 1324, 1326, 1328 has a 1x registration matching a DO registration, the top row 1320 has a DO registration 1302 with no 1x registration.

Thus, in the example content 1300 of the table 400, the first number of DO registrations would be equal to five (i.e., DO registrations 1302, 1306, 1310, 1314, 1318), the second number of 1x registrations would be equal to four (i.e., 1x registrations 1304, 1308, 1312, 1316), and the third number of identifiers and corresponding authorized and registered access terminals would be equal to five (i.e., access terminal identifiers A, B, C, D, and E).

Thus, if the first number of DO registrations has just become equal to the third number of authorized and registered access terminals (e.g., due to a DO registration being added to, or a 1x registration expiring from, the registration database 306), the private access point 202 may then, assuming the DO beacon signal was already being periodically transmitted, stop periodically transmitting (1106) the DO beacon signal.

This is shown in, e.g., FIG. 12, in which the first number of DO registrations has just become equal to the second number of 1x registrations, and, e.g., in FIG. 13, where the first number of DO registrations has just become greater than the second number of 1x registrations.

At least one of the first number of DO registrations, the second number of 1x registrations, or the third number of authorized and registered access terminals may change as authorized access terminals of the third number of authorized access terminals register on the private access point and as DO registrations and 1x registrations for the authorized access terminals expire from the memory 302.

The first number of DO registrations may be equal to the third number of authorized and registered access terminals because, e.g., the third number of authorized and registered access terminals decreased following an expiration of a 1x registration, or the first number of DO registrations increased following a DO registration being received by the memory 302 when an authorized access terminal registered on the private access point 202 in response to the DO beacon signal.

The first number of DO registrations may not be equal to the third number of authorized and registered access terminals because, e.g., the first number of DO registrations decreased following an expiration of a DO registration from the memory 302.

The private access point 202 may be configured to allow a DO registration to expire from the registration database 306 after an expiration time period elapses, so that a first number of DO registrations in the database 306 more accurately reflects a fourth number of authorized access terminals actually able to communicate with the private access point 202 for DO communications. As described above, a DO registration may be valid for the duration of a DO registration validity period, after which the DO registration may expire and be removed from the registration database 306. In an implementation, a DO registration validity period may be set at a duration of around a few minutes, although other values may be used. An access terminal whose DO registration expired may no longer actually be communicating with the private access point 202 for DO communications, but rather may be, e.g., idling on the macro access point 108 for DO communications.

As described above, when the first number of DO registrations is less than the third number of authorized and registered access terminals, the private access point 202 starts periodically transmitting (1104) a DO beacon signal on one or more carrier frequencies used by the macro access point 108. This may include, in a first period of the DO beacon signal, the private access point 202 increasing the signal strength of the DO beacon signal in steps from a first signal strength value up to a signal strength value. An example of this is illustrated in FIGS. 8A-8C. The private access point 202 may increase the signal strength of the DO beacon signal by doubling the signal strength with each step (see also, e.g., FIGS. 8A-8C). The signal strength may be doubled N times, and the second signal strength value may be $2^N$ times the first signal strength value. For example, in FIGS. 8A-8C, the signal strength of the DO beacon signal is doubled two (N=2) times, from P to 2 P and then from 2 P to 4 P. The second signal strength value may be 4 P, and the first signal strength value may be P, with the second signal strength value being four ($2^N=2^2=4$) times the first signal strength value.

In a second period of the DO beacon signal, the private access point 202 may transmit the DO beacon signal at the second signal strength value. For example, in FIG. 8A, at time $t_{10}$, the private access point 202 transmits the DO beacon signal at a second signal strength value of 4 P.

In a second period of the DO beacon signal, the private access point 202 may transmit the DO beacon signal at the first signal strength value (e.g., P) and may increase the signal strength of the DO beacon signal in steps from the first signal strength value up to the second signal strength value (e.g., 4 P).

In a second period of the DO beacon signal, the private access point 202 may transmit the DO beacon signal at a third signal strength value (e.g., 2 P). The third signal strength value may be greater than the first signal strength value (e.g., P) and less than the second signal strength value (e.g., 4 P). The private access point 202 may increase the signal strength of the DO beacon signal in steps from the third signal strength value up to the second signal strength value.

The private access point 202 starting periodically transmitting (1104) a DO beacon signal on one or more carrier frequencies used by the macro access point 108 may include, in a first period of the DO beacon signal, the private access point 202 starting transmitting the DO beacon signal at a first signal strength value on a first carrier frequency of M carrier frequencies. For example, in FIG. 9A, there are M=3 carrier frequencies, and, at time $t_o$, the private access point 202 starts transmitting the DO beacon signal at a first signal strength value of P on a first macro carrier frequency F1. Continuing with the example, at time $t_1$, the private access point 202 may then transmit the DO beacon signal at the first signal strength value of P on a second carrier frequency F2. At time $t_2$, the private access point 202 may then transmit the DO beacon signal at the first signal strength value of P on an Mth, or third, carrier frequency F3. At time $t_3$, the private access point 202 may then increase a signal strength of the DO beacon signal from the first signal strength value P to a second signal strength value 2 P and may transmit the DO beacon signal at the second signal strength value on the first carrier frequency F1. At time $t_4$, the private access point 202 may then transmit the DO beacon signal at the second signal strength value 2 P on the second carrier frequency F2. At time $t_5$, the private access point 202 may then transmit the DO beacon signal at the second signal strength value 2 P on the Mth, or third, carrier frequency F3. Eventually, at time $t_9$, the private access point 202 may temporarily stop transmitting the DO beacon signal until a second period of the DO beacon signal.

Figure 14:
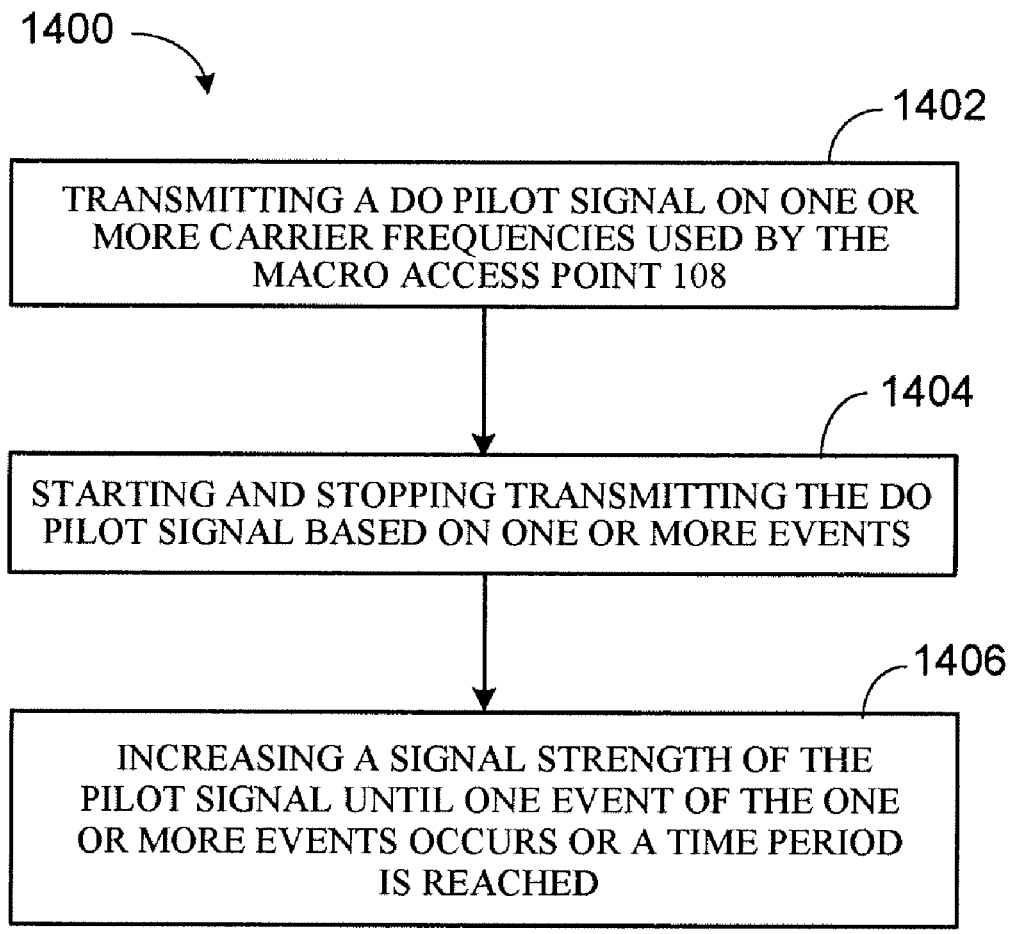
FIG. 14 is a flow diagram showing an example process of a private access point.
Figure 15:
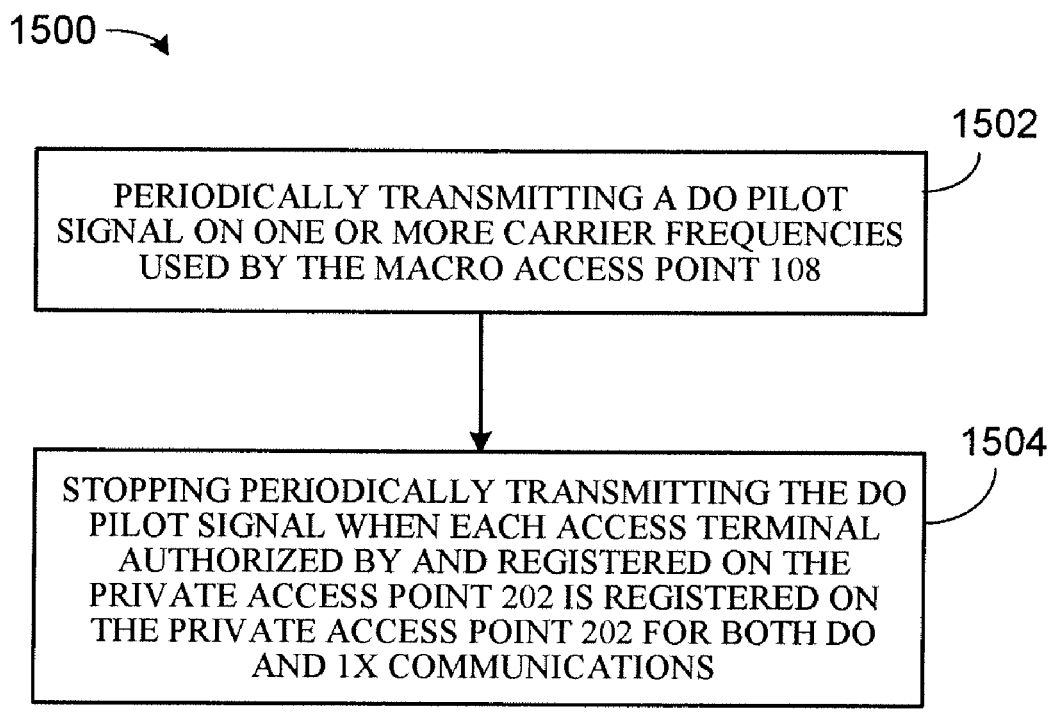
FIG. 15 is a flow diagram showing an example process of a private access point.

FIGS. 14 and 15 are flow diagrams showing example processes 1400, 1500 of a private access point such as the private access point 202 of FIG. 2 that may be configured to reduce a number of unauthorized access terminals attempting to register on the private access point. The private access point 202 may be configured to communicate via a first air interface standard, e.g., EV-DO (DO), and via a second air interface standard, e.g., 1xRTT (1x).

Processing in FIG. 14 begins, for example, when the private access point 202 transmits (1402) a beacon signal on one or more carrier frequencies used by the macro access point 108. The beacon signal corresponds to DO, e.g., the beacon signal is a DO beacon signal.

The private access point 202 starts and stops transmitting (1404) the DO beacon signal based on one or more events. The events may include, but are not limited to, the events described in, e.g., FIGS. 7 and 10. An event may include a new 1x registration being added to the registration database 306 and the new 1x registration having no matching DO registration in the registration database 306 (see, e.g., decision 706 of FIG. 7).

The private access point 202 increases a signal strength of the beacon signal until one event of the one or more events occurs or a time period is reached. The one event may include a new DO registration being added to the registration database 306 and may also include, with the new DO registration, having every 1x registration in the registration database 306 have a respective matching DO registration in the registration database 306. The time period may include the end of a duty cycle of the DO beacon signal over all carrier frequencies in a first period of the DO beacon signal. The time period may include a time at which the DO beacon signal is temporarily stopped in a first period of the DO beacon signal.

Processing in FIG. 15 begins, for example, when the private access point 202 periodically transmits (1502) a beacon signal on one or more carrier frequencies used by the macro access point 108. The beacon signal corresponds to DO, e.g., the beacon signal is a DO beacon signal.

The private access point 202 stops (1504) periodically transmitting the DO beacon signal when each access terminal authorized by and registered on the private access point 202 is registered on the private access point 202 for both EV-DO (DO) and 1xRTT (1x) communications. This may correspond to a state of the registration database 306 on the private access point 202 in which every authorized and registered access terminal that has a 1x registration has a matching DO registration in the database 306.

The private access point 202 may determine an initial signal strength value (e.g., P) of the DO beacon signal by detecting the signal strength of one or more signals from a macro access point and adding an offset. As described above, the private access point 202 may generally be capable of detecting signals from the macro access point 108. The private access point 202 may use the signal strength of these signals, plus an offset, to infer a signal strength at which the access terminal 206 (which is expected to be within range of the private access point, due to the existing 1x registration) would be expected to hear and select the DO beacon signal. In this way, the private access point 202 may determine a minimum signal strength at which to send the DO beacon signal.

Although the techniques described herein employ the 1xRTT and EV-DO air interface standards, the techniques may be applicable to other air interface technologies, such as, e.g. the LTE (Long Term Evolution) air interface.

The processes described herein are not limited to use with any particular hardware, software, or programming language; they may find applicability in any computing or processing environment and with any type of machine that is capable of running machine-readable instructions. All or part of the processes can be implemented in digital electronic circuitry, or in computer hardware, firmware, software, or in combinations thereof.

The processes described herein and their various modifications (hereinafter "the processes"), are not limited to the hardware and software described above. All or part of the processes can be implemented, at least in part, via a computer program product, e.g., a computer program tangibly embodied in an information carrier, such as one or more machine-readable storage media or in a propagated signal, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the processes can be performed by one or more programmable processing devices executing one or more computer programs to perform the functions of the processes. All or part of the processes can be implemented as, special purpose logic circuitry, e.g., an FPGA (field programmable gate array) and/ or an ASIC (application-specific integrated circuit).

Processing devices suitable for the execution of a computer program include, by way of example, both general and special purpose microprocessors, and any one or more processors of any kind of digital computer. Generally, a processing device will receive instructions and data from a read-only memory or a random access memory or both. The components of a computer include one or more processing devices for executing instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/ or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Actions associated with the processes can be rearranged and/or one or more such action can be omitted to achieve the same, or similar, results to those described herein.

Components of different implementations may be combined to form implementations not specifically set forth above. Other implementations not specifically described are also within the scope of the following claims.

What is claimed is:

1. A method, comprising:
    storing, in a memory on a private access point, first air interface standard registrations and second air interface standard registrations;
    wherein the private access point is configured to communicate via a first air interface standard and a second air interface standard with authorized and registered access terminals;

wherein the authorized and registered access terminals are authorized and registered on the private access point for communications according to at least one air interface standard of a set of air interface standards;

when a number of the first air interface standard registrations is less than a number of the authorized and registered access terminals, starting periodic transmission of a beacon signal on one or more carrier frequencies used by a macro access point, the beacon signal corresponding to the first air interface standard; and when the number of the first air interface standard registrations is equal to the number of the authorized and registered access terminals, stopping the periodic transmission of the beacon signal.

2. The method of claim 1, wherein the first air interface standard comprises EV-DO, and the second air interface standard comprises 1xRTT.

3. The method of claim 1, further comprising:

allowing a first air interface standard registration of the number of the first air interface standard registrations to expire from the memory after an expiration time period elapses, to promote the number of the first air interface standard registrations to more accurately reflect another number of authorized and registered access terminals able to communicate with the private access point for first air interface standard communications.

4. The method of claim 1, wherein at least one of the number of the first air interface standard registrations, a number of the second air interface standard registrations, or the number of the authorized access terminals change as authorized access terminals register on the private access point and as the first air interface standard registrations and the second air interface standard registrations for the number of the authorized and registered access terminals expire from the memory.

5. The method of claim 1, wherein:

when the number of the first air interface standard registrations is equal to a number of the second air interface standard registrations, the number of the first air interface standard registrations is equal to the number of the authorized and registered access terminals, and the number of the authorized and registered access terminals is nonzero:

an authorized access terminal of the number of the authorized and registered access terminals has a corresponding first air interface standard registration of the number of the first air interface standard registrations and a corresponding second air interface standard registration of the number of the second air interface standard registrations.

6. The method of claim 1, wherein starting the periodic transmission of the beacon signal comprises:

in a period of the beacon signal, increasing a signal strength of the beacon signal in steps from a first signal strength value up to a second signal strength value.

7. The method of claim 6, wherein increasing the signal strength of the beacon signal in steps comprises:

doubling the signal strength with a step.

8. The method of claim 7, wherein the signal strength is doubled N times, and the second signal strength value is $2^N$ times the first signal strength value.

9. The method of claim 6, wherein the period comprises a first period, and wherein starting the periodic transmission of the beacon signal further comprises:

in a second period of the beacon signal, transmitting the beacon signal at the second signal strength value.

10. The method of claim 6, wherein the period comprises a first period, and wherein starting the periodic transmission of the beacon signal further comprises:

in a second period of the beacon signal, transmitting the beacon signal at the first signal strength value; and increasing the signal strength of the beacon signal in steps from the first signal strength value up to the second signal strength value.

11. The method of claim 6, wherein the period comprises a first period, and wherein starting the periodic transmission of the beacon signal further comprises:

in a second period of the beacon signal, transmitting the beacon signal at a third signal strength value, the third signal strength value being greater than the first signal strength value and less than the second signal strength value; and increasing the signal strength of the beacon signal in steps from the third signal strength value up to the second signal strength value.

12. The method of claim 1, wherein starting the periodic transmission of the beacon signal comprises:

in a first period of the beacon signal, starting transmission of the beacon signal at a first signal strength value on a first carrier frequency of the one or more carrier frequencies;

transmitting the beacon signal at the first signal strength value on an Mth carrier frequency of the one or more carrier frequencies;

increasing a signal strength of the beacon signal from the first signal strength value to a second signal strength value;

transmitting the beacon signal at the second signal strength value on the first carrier frequency;

transmitting the beacon signal at the second signal strength value on the Mth carrier frequency; and temporarily stopping the transmission of the beacon signal until a second period of the beacon signal.

13. The method of claim 1, wherein the number of the first air interface standard registrations is equal to the number of the authorized and registered access terminals, in response to the number of the authorized and registered access terminals decreasing following an expiration of a second air interface standard registration from the memory.

14. The method of claim 1, wherein the number of the first air interface standard registrations is equal to the number of the authorized and registered access terminals, in response to the number of the first air interface standard registrations increasing following a first air interface standard registration being received by the memory when an authorized access terminal is registered on the private access point in response to the beacon signal.

15. The method of claim 1, wherein the number of the first air interface standard registrations is not equal to the number of the authorized and registered access terminals, in response to the number of the first air interface standard registrations decreasing following an expiration of a first air interface standard registration from the memory.

16. The method of claim 1, wherein starting the periodic transmission of the beacon signal begins at a time when that the number of the first air interface standard registrations becomes less than the number of the authorized and registered access terminals.

17. The method of claim 1, wherein the set of air interface standards comprises the first air interface standard and the second air interface standard.

18. The method of claim 17, wherein a first authorized and registered access terminal of the authorized and registered access terminal is authorized and registered on the private access point for first air interface standard communications;
wherein a second authorized and registered access terminal of the authorized and registered access terminals is authorized and registered on the private access point for second air interface standard communications; and
wherein a third authorized and registered access terminal of the authorized and registered access terminals is authorized and registered on the private access point for both first air interface standard and second air interface standard communications.

19. The method of claim 1, wherein storing comprises:
storing, in the memory, third air interface standard registrations, the private access point being further configured to communicate via a third air interface standard with the authorized and registered access terminals;
wherein the set of air interface standards comprises the first air interface standard, the second air interface standard, and the third air interface standard.

20. The method of claim 19, wherein a first authorized and registered access terminal of the authorized and registered access terminal is authorized and registered on the private access point for first air interface standard communications;
wherein a second authorized and registered access terminal of the authorized and registered access terminals is authorized and registered on the private access point for second air interface standard and third air interface standard communications; and
wherein a third authorized and registered access terminal of the authorized and registered access terminals is authorized and registered on the private access point for third air interface standard communications.

21. The method of claim 1, wherein the set of air interface standards comprises the first air interface standard, the second air interface standard, and one or more additional air interface standards.

22. The method of claim 21, wherein the one or more additional air interface standards comprise a third air interface standard and a fourth air interface standard;
wherein a first authorized and registered access terminal of the authorized and registered access terminal is authorized and registered on the private access point for third air interface standard communications;
wherein a second authorized and registered access terminal of the authorized and registered access terminals is authorized and registered on the private access point for second air interface standard and fourth air interface standard communications; and
wherein a third authorized and registered access terminal of the authorized and registered access terminals is authorized and registered on the private access point for first air interface standard, third air interface standard, and fourth air interface standard communications.

23. One or more non-transitory machine-readable media configured to store instructions that are executable by one or more processing devices to perform operations comprising:
storing, in a memory on a private access point, first air interface standard registrations and second air interface standard registrations;
wherein the private access point is configured to communicate via a first air interface standard and a second air interface standard with authorized and registered access terminals;
wherein the authorized and registered access terminals are authorized and registered on the private access point for communications according to at least one air interface standard of a set of air interface standards;
when a number of the first air interface standard registrations is less than a number of the authorized and registered access terminals,
starting periodic transmission of a beacon signal on one or more carrier frequencies used by a macro access point, the beacon signal corresponding to the first air interface standard; and
when the number of the first air interface standard registrations is equal to the number of the authorized and registered access terminals,
stopping the periodic transmission of the beacon signal.

24. The one or more non-transitory machine-readable media of claim 23, wherein the first air interface standard comprises EV-DO, and the second air interface standard comprises 1xRTT.

25. The one or more non-transitory machine-readable media of claim 23, wherein when the number of the first air interface standard registrations is equal to a number of the second air interface standard registrations, the number of the first air interface standard registrations is equal to the number of the authorized and registered access terminals, and the number of the authorized and registered access terminals is nonzero:
an authorized access terminal of the number of the authorized and registered access terminals has a corresponding first air interface standard registration of the number of the first air interface standard registrations and a corresponding second air interface standard registration of the number of the second air interface standard registrations.

26. The one or more non-transitory machine-readable media of claim 23, wherein starting the periodic transmission of the beacon signal comprises:
in a period of the beacon signal,
increasing a signal strength of the beacon signal in steps from a first signal strength value up to a second signal strength value.

27. The one or more non-transitory machine-readable media of claim 26, wherein increasing the signal strength of the beacon signal in steps comprises:
doubling the signal strength with a step.

28. The one or more non-transitory machine-readable media of claim 23, wherein starting the periodic transmission of the beacon signal comprises:
in a first period of the beacon signal, starting transmission of the beacon signal at a first signal strength value on a first carrier frequency of the one or more carrier frequencies;
transmitting the beacon signal at the first signal strength value on an Mth carrier frequency of the one or more carrier frequencies;
increasing a signal strength of the beacon signal from the first signal strength value to a second signal strength value;
transmitting the beacon signal at the second signal strength value on the first carrier frequency;
transmitting the beacon signal at the second signal strength value on the Mth carrier frequency; and temporarily stopping the transmission of the beacon signal until a second period of the beacon signal.

29. The one or more non-transitory machine-readable media of claim 23, wherein the number of the first air interface standard registrations is equal to the number of the authorized and registered access terminals, in response to the number of the authorized and registered access terminals decreasing following an expiration of a second air interface standard registration from the memory.

30. The one or more non-transitory machine-readable media of claim 23, wherein the number of the first air interface standard registrations is equal to the number of the authorized and registered access terminals, in response to the number of the first air interface standard registrations increasing following a first air interface standard registration being received by the memory when an authorized access terminal is registered on the private access point in response to the beacon signal.

31. The one or more non-transitory machine-readable media of claim 23, wherein the number of the first air interface standard registrations is not equal to the number of the authorized and registered access terminals, in response to the number of the first air interface standard registrations decreasing following an expiration of a first air interface standard registration from the memory.

32. The one or more non-transitory machine-readable media of claim 23, wherein starting the periodic transmission of the beacon signal begins at a time when that the number of the first air interface standard registrations becomes less than the number of the authorized and registered access terminals.

33. The one or more non-transitory machine-readable media of claim 23, wherein the set of air interface standards comprises the first air interface standard and the second air interface standard.

34. The one or more non-transitory machine-readable media of claim 33, wherein a first authorized and registered access terminal of the authorized and registered access terminal is authorized and registered on the private access point for first air interface standard communications;
wherein a second authorized and registered access terminal of the authorized and registered access terminals is authorized and registered on the private access point for second air interface standard communications; and
wherein a third authorized and registered access terminal of the authorized and registered access terminals is authorized and registered on the private access point for both first air interface standard and second air interface standard communications.

35. The one or more non-transitory machine-readable media of claim 23, wherein storing comprises:
storing, in the memory, third air interface standard registrations, the private access point being further configured to communicate via a third air interface standard with the authorized and registered access terminals;
wherein the set of air interface standards comprises the first air interface standard, the second air interface standard, and the third air interface standard.

36. A system, comprising:
a private access point configured to communicate via a first air interface standard and a second air interface standard with authorized and registered access terminals, the authorized and registered access terminals being authorized and registered on the private access point for communications according to at least one air interface standard of a set of air interface standards;
wherein the private access point comprises:
memory configured to store first air interface standard registrations and second air interface standard registrations and instructions; and
one or more processing devices configured to execute the instructions to perform operations comprising:
when a number of the first air interface standard registrations is less than a number of the authorized and registered access terminals,
starting periodic transmission of a beacon signal on one or more carrier frequencies used by a macro access point, the beacon signal corresponding to the first air interface standard; and
when the number of the first air interface standard registrations is equal to the number of the authorized and registered access terminals,
stopping the periodic transmission of the beacon signal.

37. The system of claim 36, wherein the first air interface standard comprises EV-DO, and the second air interface standard comprises 1xRTT.

38. The system of claim 36, wherein when the number of the first air interface standard registrations is equal to a number of the second air interface standard registrations, the number of the first air interface standard registrations is equal to the number of the authorized and registered access terminals, and the number of the authorized and registered access terminals is nonzero;
an authorized access terminal of the number of the authorized and registered access terminals has a corresponding first air interface standard registration of the number of the first air interface standard registrations and a corresponding second air interface standard registration of the number of the second air interface standard registrations.

39. The system of claim 36, wherein starting the periodic transmission of the beacon signal comprises:
in a period of the beacon signal,
increasing a signal strength of the beacon signal in steps from a first signal strength value up to a second signal strength value.

40. The system of claim 39, wherein increasing the signal strength of the beacon signal in steps comprises:
doubling the signal strength with a step.

41. The system of claim 36, wherein starting the periodic transmission of the beacon signal comprises:
in a first period of the beacon signal, starting transmission of the beacon signal at a first signal strength value on a first carrier frequency of the one or more carrier frequencies;
transmitting the beacon signal at the first signal strength value on an Mth carrier frequency of the one or more carrier frequencies;
increasing a signal strength of the beacon signal from the first signal strength value to a second signal strength value;
transmitting the beacon signal at the second signal strength value on the first carrier frequency;
transmitting the beacon signal at the second signal strength value on the Mth carrier frequency; and
temporarily stopping the transmission of the beacon signal until a second period of the beacon signal.

42. The system of claim 36, wherein the number of the first air interface standard registrations is equal to the number of the authorized and registered access terminals, in response to the number of the authorized and registered access terminals decreasing following an expiration of a second air interface standard registration from the memory.

43. The system of claim 36, wherein the number of the first air interface standard registrations is equal to the number of the authorized and registered access terminals, in response to the number of the first air interface standard registrations increasing following a first air interface standard registration being received by the memory when an authorized access terminal is registered on the private access point in response to the beacon signal.

44. The system of claim 36, wherein the number of the first air interface standard registrations is not equal to the number of the authorized and registered access terminals, in response to the number of the first air interface standard registrations decreasing following an expiration of a first air interface standard registration from the memory.

45. The system of claim 36, wherein starting the periodic transmission of the beacon signal begins at a time when that the number of the first air interface standard registrations becomes less than the number of the authorized and registered access terminals.

46. The system of claim 36, wherein the set of air interface standards comprises the first air interface standard and the second air interface standard.

47. The system of claim 46, wherein a first authorized and registered access terminal of the authorized and registered access terminal is authorized and registered on the private access point for first air interface standard communications;
wherein a second authorized and registered access terminal of the authorized and registered access terminals is authorized and registered on the private access point for second air interface standard communications; and
wherein a third authorized and registered access terminal of the authorized and registered access terminals is authorized and registered on the private access point for both first air interface standard and second air interface standard communications.

48. The system of claim 36, wherein the memory is further configured to store third air interface standard registrations, the private access point being further configured to communicate via a third air interface standard with the authorized and registered access terminals; and
wherein the set of air interface standards comprises the first air interface standard, the second air interface standard, and the third air interface standard.

49. A method, comprising:
transmitting, from a private access point, a beacon signal on one or more carrier frequencies used by a macro access point, the private access point being configured to communicate via a first air interface standard and a second air interface standard, the first air interface standard comprising EV-DO, the beacon signal corresponding to EV-DO;
starting and stopping transmission of the beacon signal based on one or more events; and
increasing a signal strength of the beacon signal until one event of the one or more events occurs or a time period is reached.

50. A private access point configured to communicate via a first air interface standard and a second air interface standard, the first air interface standard comprising EV-DO, the private access point comprising:
means for transmitting a beacon signal on one or more carrier frequencies used by a macro access point, the beacon signal corresponding to EV-DO;
means for starting and stopping transmission of the beacon signal based on one or more events; and
means for increasing a signal strength of the beacon signal until one event of the one or more events occurs or a time period is reached.

51. One or more non-transitory machine-readable media configured to store instructions that are executable by one or more processing devices to perform operations comprising:
transmitting, from a private access point, a beacon signal on one or more carrier frequencies used by a macro access point, the private access point being configured to communicate via a first air interface standard and a second air interface standard, the first air interface standard comprising EV-DO, the beacon signal corresponding to EV-DO;
starting and stopping transmission of the beacon signal based on one or more events; and
increasing a signal strength of the beacon signal until one event of the one or more events occurs or a time period is reached.

52. A system, comprising:
a private access point configured to communicate via a first air interface standard and a second air interface standard, the first air interface standard comprising EV-DO, the private access point comprising:
memory configured to store instructions; and
one or more processing devices configured to execute the instructions to perform operations comprising:
transmitting a beacon signal on one or more carrier frequencies used by a macro access point, the beacon signal corresponding to EV-DO;
starting and stopping transmission of the beacon signal based on one or more events; and
increasing a signal strength of the beacon signal until one event of the one or more events occurs or a time period is reached.

53. A method, comprising:
periodically transmitting, from a private access point, a beacon signal on one or more carrier frequencies used by a macro access point, the private access point being configured to communicate via a first air interface standard and a second air interface standard, the beacon signal corresponding to a first air interface standard; and
stopping periodic transmission of the beacon signal when an access terminal authorized by and registered on the private access point is registered on the private access point for first air interface standard communications.

54. The method of claim 53, further comprising:
determining an initial signal strength value of the beacon signal by detecting a signal strength of one or more signals from the macro access point and adding an offset.

55. A private access point configured to communicate via a first air interface standard and a second air interface standard, the private access point comprising:
means for periodically transmitting a beacon signal on one or more carrier frequencies used by a macro access point, the beacon signal corresponding to the first air interface standard; and
means for stopping periodic transmission of the beacon signal when an access terminal authorized by and registered on the private access point is registered on the private access point for first air interface standard communications.

56. One or more non-transitory machine-readable media configured to store instructions that are executable by one or more processing devices to perform operations comprising:
periodically transmitting, from a private access point, a beacon signal on one or more carrier frequencies used by a macro access point, the private access point being configured to communicate via a first air interface standard and a second air interface standard, the beacon signal corresponding to a first air interface standard; and stopping periodic transmission of the beacon signal when an access terminal authorized by and registered on the private access point is registered on the private access point for first air interface standard communications.

57. A system, comprising:

a private access point configured to communicate via a first air interface standard and a second air interface standard, the private access point comprising:

memory configured to store instructions; and one or more processing devices configured to execute the instructions to perform operations comprising:

periodically transmitting a beacon signal on one or more carrier frequencies used by a macro access point, the beacon signal corresponding to the first air interface standard; and stopping periodic transmission of the beacon signal when an access terminal authorized by and registered on the private access point is registered on the private access point for first air interface standard communications.

* * * * *